United States Patent
Zhu et al.

(10) Patent No.: US 11,864,302 B2
(45) Date of Patent: Jan. 2, 2024

(54) HIGH VOLTAGE GENERATOR AND CONTROL METHODS THEREOF

(71) Applicants: SHANGHAI UNITED IMAGING HEALTHCARE CO., LTD., Shanghai (CN); SHANGHAI ADVANCED RESEARCH INSTITUTE, CHINESE ACADEMY OF SCIENCES, Shanghai (CN)

(72) Inventors: Guoping Zhu, Shanghai (CN); Xu Chu, Shanghai (CN)

(73) Assignees: SHANGHAI UNITED IMAGING HEALTHCARE CO., LTD., Shanghai (CN); SHANGHAI ADVANCED RESEARCH INSTITUTE, CHINESE ACADEMY OF SCIENCES, Shanghai (CN)

( * ) Notice: Subject to any disclaimer, the term of this patent is extended or adjusted under 35 U.S.C. 154(b) by 290 days.

(21) Appl. No.: 17/446,972

(22) Filed: Sep. 6, 2021

(65) Prior Publication Data

US 2021/0410259 A1    Dec. 30, 2021

Related U.S. Application Data

(63) Continuation of application No. 16/235,186, filed on Dec. 28, 2018, now Pat. No. 11,116,068, which is a
(Continued)

(30) Foreign Application Priority Data

Nov. 3, 2017    (CN) .......................... 201711070608.1

(51) Int. Cl.
*H02M 1/08*    (2006.01)
*H05G 1/12*    (2006.01)
(Continued)

(52) U.S. Cl.
CPC .............. *H05G 1/12* (2013.01); *H02M 1/081* (2013.01); *H02M 3/01* (2021.05); *H02M 3/3376* (2013.01);
(Continued)

(58) Field of Classification Search
None
See application file for complete search history.

(56) References Cited

U.S. PATENT DOCUMENTS 6,548,985 B1 * 4/2003 Hayes ............... H02M 3/33573
320/108
8,605,463 B2    12/2013 Nakanishi
(Continued)

FOREIGN PATENT DOCUMENTS

CN    102412726 A    4/2012
CN    104682577 A    6/2015
(Continued)

OTHER PUBLICATIONS

International Search Report in PCT/CN2018/113812 dated Feb. 12, 2019, 4 pages.
(Continued)

*Primary Examiner* — Hoon K Song
(74) *Attorney, Agent, or Firm* — METIS IP LLC

(57) ABSTRACT

A high voltage generator is provided. The high voltage generator includes an inverter circuit coupled to receive a direct-current (DC) input voltage, a resonant circuit coupled to the inverter circuit, a transformer coupled to the resonant circuit and also coupled to provide a high voltage output to a high voltage device, and a phase control circuit coupled to receive a voltage across and a current through the resonant circuit and also coupled to the inverter circuit. The phase control circuit generates control signals to drive the inverter
(Continued)

circuit. The control signals drive the inverter circuit to keep the resonant circuit operating in an inductive region.

20 Claims, 14 Drawing Sheets

Related U.S. Application Data continuation of application No. PCT/CN2018/113812, filed on Nov. 2, 2018.

(51) Int. Cl.
    *H02M 3/337* (2006.01)
    *H02M 3/00* (2006.01)
    *H02M 3/335* (2006.01)
    H02M 1/00 (2006.01)
    H02M 1/34 (2007.01)

(52) U.S. Cl.
    CPC ...... *H02M 3/33573* (2021.05); *H02M 1/0009* (2021.05); *H02M 1/0058* (2021.05); *H02M 1/346* (2021.05); *Y02B 70/10* (2013.01)

(56) References Cited

U.S. PATENT DOCUMENTS

| | | | |
|---|---|---|---|
| 8,624,573 B2 | 1/2014 | Yu et al. | |
| 9,281,753 B2* | 3/2016 | Reddy | H02M 3/33507 |
| 2011/0080757 A1* | 4/2011 | Young | H02M 3/3376 363/21.02 |
| 2012/0055455 A1 | 3/2012 | Ruan et al. | |
| 2014/0176086 A1* | 6/2014 | Crewson | H02M 3/3376 363/17 |
| 2014/0233267 A1 | 8/2014 | Jin et al. | |
| 2014/0241507 A1 | 8/2014 | Woywode et al. | |
| 2018/0063932 A1* | 3/2018 | Leibl | H05G 1/12 |
| 2018/0278167 A1* | 9/2018 | Deboy | H02M 1/083 |
| 2019/0200441 A1 | 6/2019 | Zhu et al. | |

FOREIGN PATENT DOCUMENTS

| | | |
|---|---|---|
| CN | 104734511 A | 6/2015 |
| CN | 105228326 A | 1/2016 |
| CN | 106301050 A | 1/2017 |
| CN | 106358354 A | 1/2017 |
| CN | 106455278 A | 2/2017 |
| CN | 106783483 A | 5/2017 |
| CN | 106787768 A | 5/2017 |

OTHER PUBLICATIONS

Written Opinion in PCT/CN2018/113812 dated Feb. 12, 2019, 5 pages.
First Office Action in Chinese Application No. 201711070608.1 dated Feb. 26, 2019, 12 pages.
The Second Office Action in Chinese Application No. 201711070608.1 dated Apr. 30, 2019, 13 pages.

* cited by examiner

HIGH VOLTAGE GENERATOR AND CONTROL METHODS THEREOF

CROSS-REFERENCE TO RELATED APPLICATIONS

This application is a Continuation of U.S. patent application Ser. No. 16/235,186, filed on Dec. 28, 2018, which is a Continuation of International Application No. PCT/CN2018/113812, filed on Nov. 2, 2018, which claims priority to Chinese Patent Application No. 201711070608.1, filed on Nov. 3, 2017. Each of the above-referenced applications is incorporated herein by reference in its entirety.

TECHNICAL FIELD

The invention relates to medical X-ray tube high voltage generators, and especially relates to the multi-resonant circuits therein and the control methods thereof.

BACKGROUND

X-ray tube high voltage generators need to provide a wide range of output voltage and current to meet different clinical needs. For example, the output voltage of a 50 kW high voltage generator for a Computed Tomography (CT) equipment typically ranges from 60 kV to 140 kV, and the output current ranges from 10 mA to 420 mA. Meanwhile, to accommodate different geographical areas and different grid conditions, the high voltage generator is usually required to be compatible with the wide range of grid input from 380 VAC (±15%) to 480 VAC (±15%), which will result in a wide dynamic range of the voltage on the DC bus. Also, the input side of the high voltage generator usually uses a three-phase uncontrolled rectifier but can only use capacitor of limited capacitance because of the limit of the volume of the system. As a result, a 300 HZ (or 360 HZ) ripple with a large amplitude may appear on the DC bus, further increasing the dynamic range of the voltage on the DC bus.

Because a CT high voltage generator should support radiation of long durations, only an insulated-gate bipolar transistor (IGBT) can be used as a switch transistor. But IGBT's inherent characteristics limit the switch frequency to below 20 kHz~30 kHz. Soft-switching techniques are usually used to increase the frequency of the switch transistors. But even then, the switch frequencies in industrial applications rarely exceed 100 kHz without sacrificing stability or reliability of the voltage converter.

In a prior art X-ray tube high voltage generator, to increase the frequency of the switch transistor and to reduce the volume of the high voltage generator, the inverter circuit usually uses a PFM (Pulse Frequency Modulation) modulated resonant converter. But prior art resonant circuits require that the switch transistor operate in a wide range of frequencies to accommodate wide range of input and output voltages, which leads to problems such as instability and increased loss of IGBT at high frequencies and increased volume and noise at lower frequencies.

SUMMARY

Consistent with embodiments of the present disclosure, there is provided a high voltage generator. The high voltage generator includes an inverter circuit coupled to receive a direct-current (DC) input voltage, a resonant circuit coupled to the inverter circuit, a transformer coupled to the resonant circuit and also coupled to provide a high voltage output to a high voltage device, and a phase control circuit coupled to receive a voltage across and a current through the resonant circuit and also coupled to the inverter circuit. The phase control circuit generates control signals to drive the inverter circuit. The control signals drive the inverter circuit to keep the resonant circuit operating in an inductive region.

In some embodiments, the control signals drives the inverter circuit working at frequency higher than the upper resonance peak, based on the phase delay between the voltage and the current, and the upper resonance peak is corresponding to a first resonant frequency.

In some embodiments, further comprising an amplitude limiting circuit coupled to the rectifier circuit, the control signals drives the inverter circuit to work at frequency lower than the lower resonant peak based on the selection of the amplitude limiting circuit, and the lower resonant peak is corresponding to a second resonant frequency.

In some embodiments, the resonant circuit includes at least an inductor serially connected to a capacitor.

In some embodiments, the serially connected inductor and capacitor are coupled in parallel to the primary windings of the transformer.

In some embodiments, the serially connected inductor and capacitor are serially coupled to the primary windings of the transformer.

In some embodiments, the serially connected inductor and capacitor are coupled in parallel to the secondary windings of the transformer.

In some embodiments, the resonant circuit includes at least an inductor connected to a capacitor in parallel.

In some embodiments, the parallely connected inductor and capacitor are serially coupled to the primary windings of the transformer.

Consistent with embodiments of the present disclosure, there is also provided a high voltage generator that includes an inverter circuit coupled to receive a direct-current (DC) input voltage, a resonant circuit coupled to the inverter circuit, a transformer having primary and secondary windings, the transformer being coupled to the resonant circuit and also coupled to provide a high voltage output to a high voltage device, and a control circuit including a phase control circuit, an amplitude limiting circuit, and a control signal generator. The phase control circuit is coupled to compare the phase of the voltage across the resonant circuit with the phase of the current through the resonant circuit. The amplitude limiting circuit compares the high voltage output to a reference high voltage. The control signal generator generates control signals, based on the comparison by the phase control circuit and the comparison by the amplitude limiting circuit to drive the inverter circuit. The control signals drive the inverter circuit to keep the resonant circuit operating in an inductive region. The control signals drive the inverter circuit to maintain the high voltage output above a minimum level.

Consistent with embodiments of the present disclosure, there is further provided a high voltage generator including an inverter bridge, a first resonant branch, a second resonant branch, a transformer, and a rectifier circuit. The inverter bridge includes a first bridge leg and a second bridge leg, the first bridge leg or the second bridge leg including at least two switch transistors distributed in series. The first resonant branch coupled in series to the first bridge leg. The transformer coupled in series between the first resonant branch and the second bridge leg. The second resonant branch coupled in parallel with the transformer. The rectifier circuit coupled with the transformer for providing an output voltage to the X-ray source.

In some embodiments, the first resonant branch comprises a series resonant branch comprising capacitors and/or inductors.

In some embodiments, the second resonant branch is coupled in parallel with the primary side or the secondary side of the transformer, and the second resonant branch comprises capacitors and inductors.

In some embodiments, the switch transistor comprises an IGBT transistor, the IGBT transistor is operated between the first switching frequency and the second switching frequency, the first switching frequency is determined based on the first resonant branch and the second resonant branch, the second switching frequency is determined by the second resonant branch.

In some embodiments, further comprising a control circuit, the control circuit comprising a first control branch, a second control branch, and a modulator, and both the first control branch and the second control branch being coupled to the modulator; wherein the first control branch is operable to obtain an output current and a bridge leg voltage of the inverter bridge, and to produce a first control signal based on the output current and the bridge leg voltage of the inverter bridge; wherein the second control branch is operable to receive a voltage feedback signal from the rectifier circuit or the X-ray generating device, and to produce a second control signal based on the voltage feedback signal.

In some embodiments, the first control branch comprises: a first zero-crossing comparator, an input of the first zero-crossing comparator being coupled with the output of the first bridge leg; a second zero-crossing comparator, an input of the second zero-crossing comparator being coupled with the output of the inverter bridge; a phase delay coupled in series to the first zero-crossing comparator; a phase comparator, an output of the phase delay and the output of the second zero-crossing comparator being coupled with an input of phase comparator; and a carrier generator, an input of the carrier generator being coupled with an output of the phase comparator, and an output of the carrier generator being coupled with the input of the modulator.

In some embodiments, the second control branch comprising: an adder, an input of the adder being coupled with an output of the rectifier circuit or an output of the X-ray generating device; a regulator coupled with an output of the adder; a limiter, an input of the limiter being coupled with an output of the regulator, and an output of the limiter being coupled with an input of the modulator.

Consistent with embodiments of the present disclosure, there is further provided an X-ray generation device. The X-ray generation device includes an X-ray tube and a high voltage generator configured to generate a tube voltage to be applied to the X-ray tube. The high voltage generator includes an inverter bridge, the inverter bridge comprising a first bridge leg and a second bridge leg, the first bridge leg and the second bridge leg being coupled in parallel, and the first bridge leg or the second bridge leg comprising two or more switch transistors distributed in series; a first resonant branch, the first resonant branch being coupled with the first bridge leg; a transformer comprising a primary side winding and a secondary side winding, the primary side winding and the first resonant branch being coupled in series, and the primary side winding being coupled with the second bridge leg; a second resonant branch, the second resonant branch being coupled in parallel to the primary side winding or the secondary side winding of the transformer; and a rectifier circuit, the rectifier circuit being coupled with the secondary side winding of the transformer for providing output voltage to an X-ray generating device.

Consistent with embodiments of the present disclosure, there is further provided a method for controlling a high voltage generator. The high voltage generator includes an inverter bridge, the inverter bridge comprising a first bridge leg and a second bridge leg, the first bridge leg and the second bridge leg being coupled in parallel, and the first bridge leg or the second bridge leg comprising two or more switch transistors distributed in series; a first resonant branch, the first resonant branch being coupled with the first bridge leg; a transformer comprising a primary side winding and a secondary side winding, the primary side winding and the first resonant branch being coupled in series, and the primary side winding being coupled with the second bridge leg; a second resonant branch, the second resonant branch being coupled in parallel to the primary side winding or the secondary side winding of the transformer; and a rectifier circuit, the rectifier circuit being coupled with the secondary side winding of the transformer for providing output voltage to an X-ray generating device. The method includes controlling the phase relationship between the bridge leg voltage and the output current of the inverter bridge to control a frequency of a driving signal of the switch transistors of the inverter bridge.

In some embodiments, controlling the phase relationship between the bridge leg voltage and the output current of the inverter bridge to control the frequency of the driving signal of the switch transistors of the inverter bridge comprises: obtaining an output current and a bridge leg voltage of the inverter bridge; generating a phase signal based on the bridge leg voltage and the output current, and generating a first control signal based on the phase signal; obtaining an output voltage of the rectifier circuit, and producing a second control signal based on the output voltage of the rectifier circuit; and generating a driving signal for the switch transistors for driving the switch transistors to operate based on the first control signal and the second control signal.

In some embodiments, the phase of the bridge leg voltage is ahead of the phase of the output current of the inverter bridge.

In some embodiments, the first bridge leg is configured to couple to the anode of an X-ray generation device, the second bridge leg is configured to couple to the cathode of the X-ray generating device.

In some embodiments, the first bridge leg or the second bridge leg comprises a plurality of IGBT transistors, the plurality of IGBT transistors are operated between the first switching frequency and the second switching frequency, the first switching frequency is determined based by the first resonant branch and the second resonant branch, the second switching frequency is determined by the second resonant branch.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
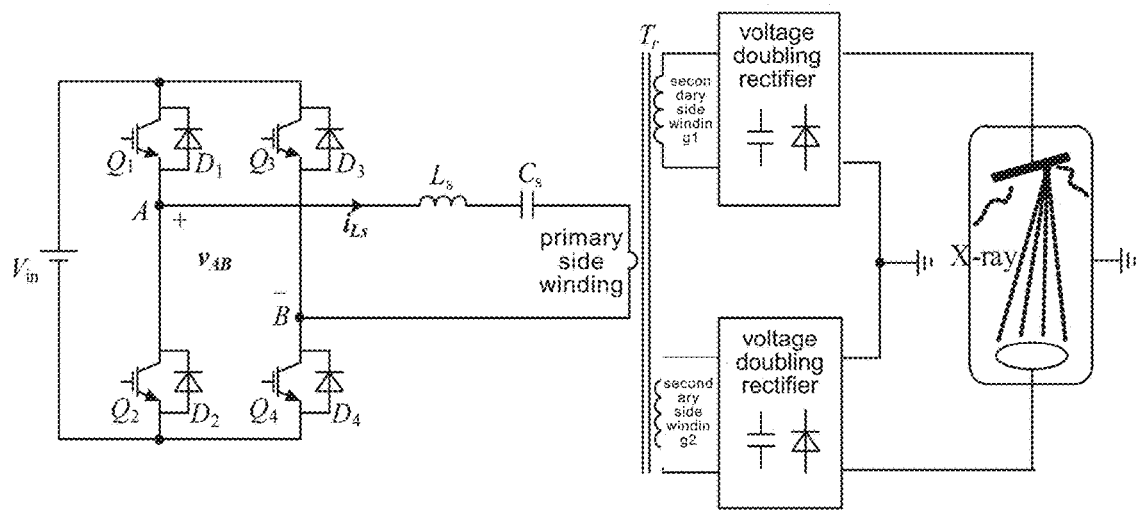
FIG. 1 illustrates a prior art LC series resonance-based X-ray tube high voltage generator.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Various aspects are now described with respect to the figures. In the following description, numerous specific details are set forth to facilitate understanding of one or more aspects of the present disclosure. However, it will be apparent to those skilled in the art that these aspects may be practiced without these specific details.

FIGS. 1-8 illustrate various prior art X-ray tube high voltage generators and a plot of their gain with respect to the switching frequency. Prior art X-ray tube high voltage generators typically use a resonant converter or inverter, where the switch transistors (such as IGBT) are controlled by PWM (Pulse Width Modulation) or PFM to vary the output power or voltage. With PWM, the switch transistors operate in hard-switching mode commonly associated with higher switching loss. To reduce switching loss, the converter must operate at lower frequencies, which means increased size (or volume) and limited application of the high voltage generator. PFM, on the other hand, typically implements soft switching of the switch transistors, thereby significantly reducing switching loss. Consequently, the high voltage generator can operate at higher switching frequencies and be implemented with smaller size or volume, providing for more diverse applications. However, as illustrated in FIGS. 1-8 and described below, conventional resonant converters, for example, LC series resonant converters, LC parallel resonant converters, LCC series-parallel resonant converters, LLC half-bridge resonant converters, must be operated in a wide range of frequencies to provide a wide range of output voltages.

FIG. 1 illustrates a prior art LC series resonance-based X-ray tube high voltage generator. As shown in FIG. 1, a direct-current (DC) power $V_{in}$ is provided to an LC resonant circuit through an inverter bridge composed of four switch transistors $Q_1$, $Q_2$, $Q_3$, and $Q_4$, and four diodes $D_1$, $D_2$, $D_3$, and $D_4$ connected anti-parallel across the switch transistors. The switch transistors are turned on and off by PFM signals provided to the gates thereof, thereby providing alternating current (AC) voltage $v_{AB}$ with a switching frequency $f_s$ corresponding to the PFM control signals. The AC voltage $v_{AB}$ is applied to the series LC resonant circuit, which includes a series inductor $L_s$ and a series capacitor $C_s$, serially connected with the primary side of a transformer $T_r$. Transformer $T_r$ transforms the AC voltage $v_{AB}$ to a higher AC voltage through the coupling between its primary and secondary windings. On the right side, the higher AC output voltage at the secondary windings is rectified by two voltage doubling rectifiers into a high-power DC voltage, which is then supplied to the X-ray tube.

Figure 2:
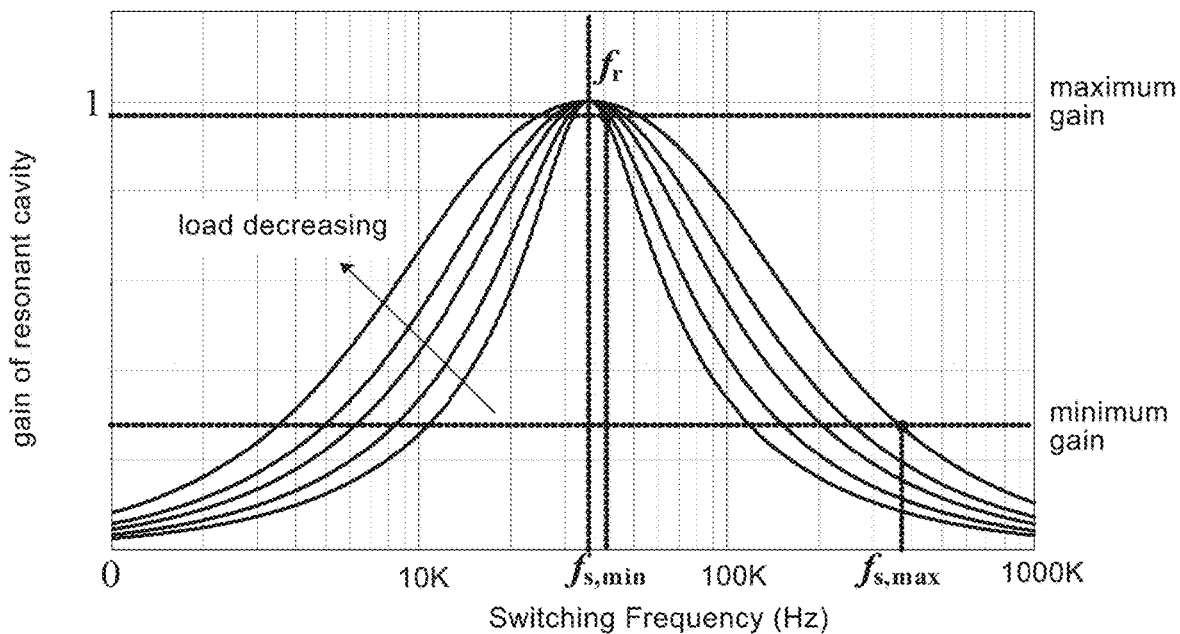
FIG. 2 illustrates the gain of the prior art X-ray tube high voltage generator of FIG. 1 with respect to the switching frequency.

FIG. 2 plots the normalized gain g of the resonant converter circuit in FIG. 1 with respect to the switching frequency $f_s$. The gain g is plotted along the vertical axis as a measurement of the output voltage as compared to the input voltage and normalized to the maximum output to input ratio, and thus varies between 0 and 1. The switching frequency is plotted along the lateral axis in logarithm scale. As shown in FIG. 2, the gain peaks at a resonant frequency $f_r$ defined by the inductance $L_s$ and capacitance $C_s$, i.e., $$\frac{1}{2\pi\sqrt{L_r C_r}},$$

and decreases on both sides of the resonant frequency as the switching frequency $f_s$ shifts away from the resonant frequency $f_r$. In the example shown, the resonant frequency is about 40 kHz.

To provide a wide range output voltage, the resonant converter circuit must operate in a wide range of gain g, for example, between the two dotted lines labeled "minimum gain" and "maximum gain." As shown in FIG. 2, the range of gain also dictates the range of the switching frequency $f_s$. Because the volume or size of a converter circuit operating increases as the switching frequency decreases and because lower frequency tends to fall into sound frequency range leading to audio noise, it is preferable that the converter circuit operates on the right side of the resonant frequency. In the example shown, the range of switching frequency $f_s$ providing the necessary range of gain is therefore, e.g., ~50 kHz ($f_{s,min}$)-~380 kHz ($f_{s,max}$). This operation range poses problems because the minim (50 kHz) is still very low, requiring large size converter circuit, and the maximum (380 kHz) is far above the capabilities of IGBT switches (about 100 kHz).

Figure 3:
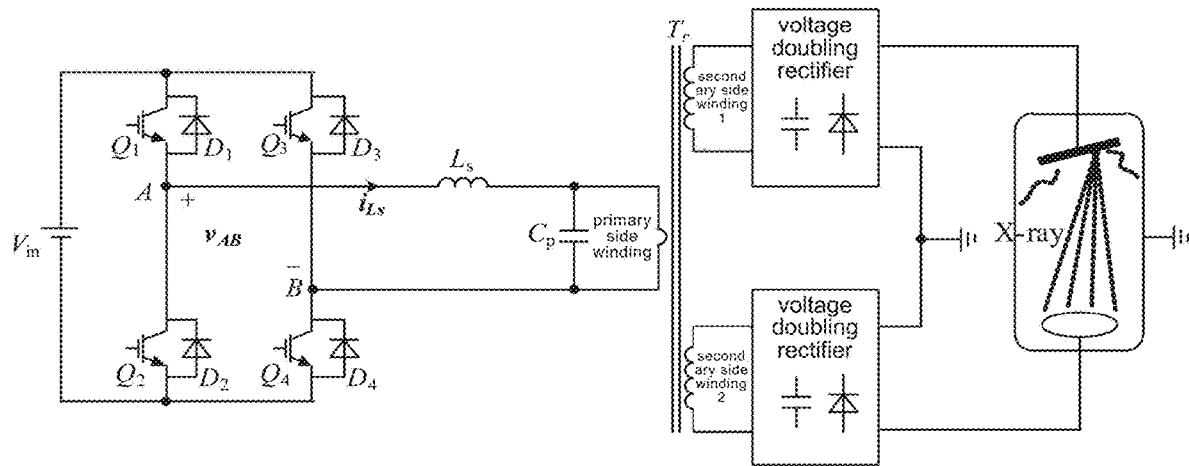
FIG. 3 illustrates a prior art LC parallel resonance-based X-ray tube high voltage generator.
Figure 4:
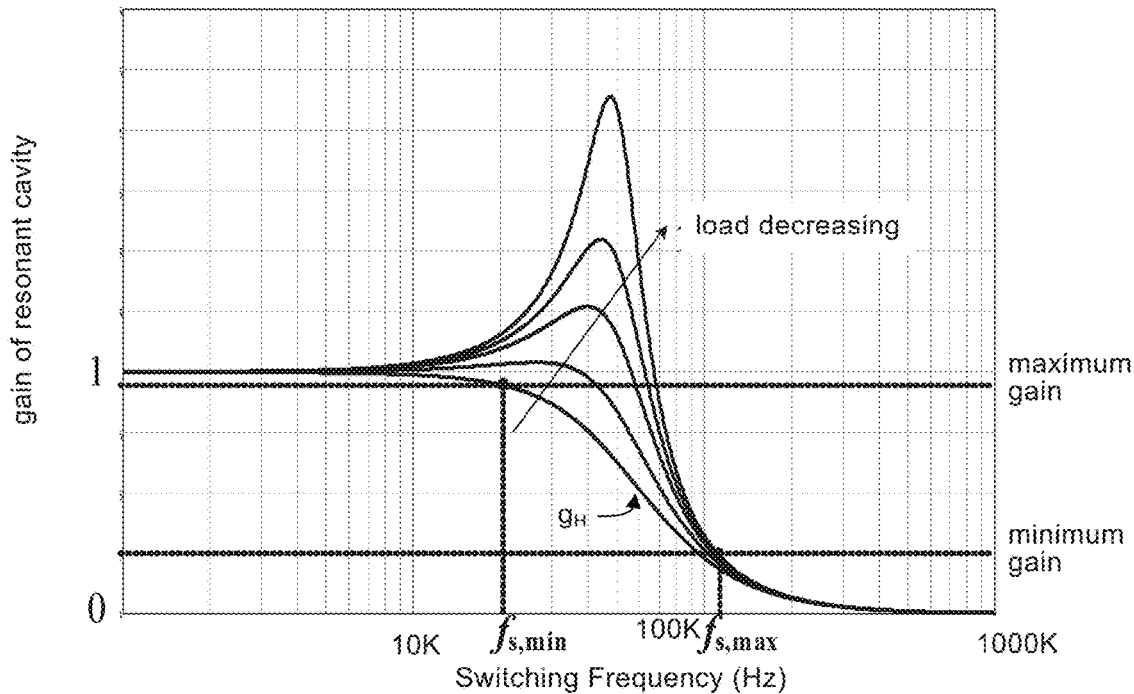
FIG. 4 illustrates the gain of the prior art X-ray tube high voltage generator of FIG. 2 with respect to the switching frequency.

FIG. 3 illustrates a prior art parallel LC resonance-based X-ray tube high voltage generator. The circuit of FIG. 3 is largely the same as that in FIG. 1, except that a parallel capacitor $C_p$ is connected in parallel with the load, i.e., transformer $T_r$ and the rest of the circuit on the right side of the transformer. FIG. 4 plots the normalized gain g of the resonant converter circuit of FIG. 3 with respect to the frequency $f_s$. To achieve the wide range of output under different load conditions, the switching frequency $f_s$ needs to vary in the wide range of approximately 20 kHz ($f_{s,min}$) to approximately 120 kHz ($f_{s,max}$). Moreover, it is important that the circuit operate on one side of the resonant frequency to avoid instability. But as FIG. 4 shows, with decreasing load, the resonant frequency increases, and the peak of the gain curve shifts right. Thus, it is impossible to have a fixed minimum operating frequency $f_{s,min}$ that provides the desired gain. For example, the minimum operating frequency with the lightest load shown is about 70 kHz, indicated on the curve by label $f_{s,min-L}$, but at that frequency the gain drops by about 60%, i.e., 0.4, when the load is the heaviest shown, indicated on the curve by $g_H$. It is therefore difficult to maintain the operating frequency on the right side of the peak with a wide range of load while preserving the wide range of output.

Figure 5:
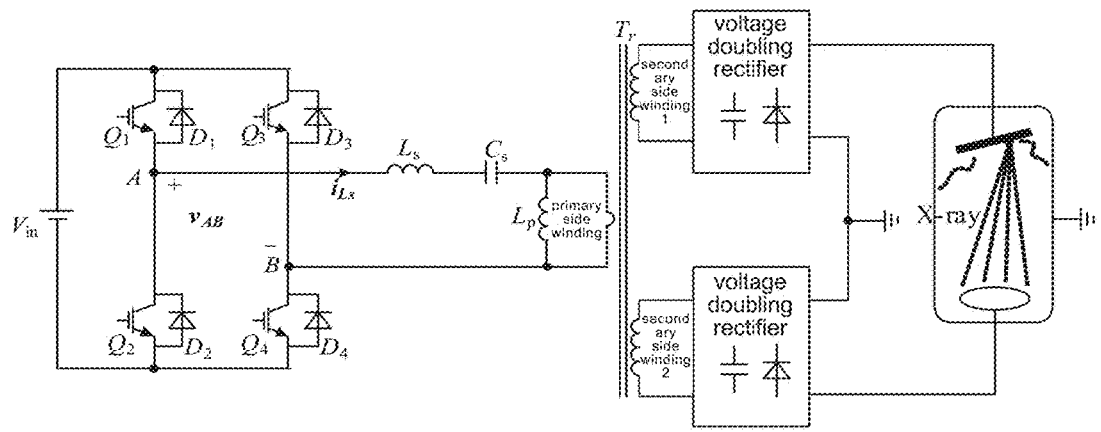
FIG. 5 illustrates a prior art LLC series resonance-based X-ray tube high voltage generator.
Figure 6:
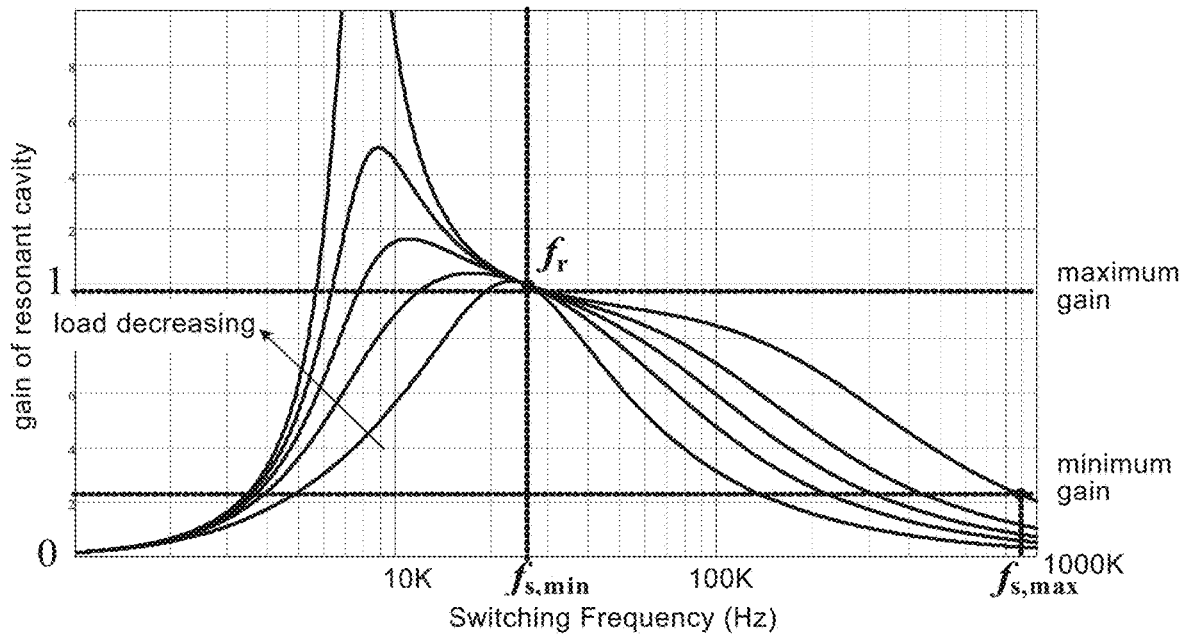
FIG. 6 illustrates the gain of the prior art X-ray tube high voltage generator of FIG. 5 with respect to the switching frequency.

FIG. 5 illustrates a prior art LLC half-bridge resonance-based X-ray tube high voltage generator. Compared to the circuits of FIGS. 1 and 3, the circuit in FIG. 5 utilizes an LLC resonant circuit, including a series inductor $L_s$, a series capacitor $C_s$, and an inductor $L_p$ connected in parallel with the load. FIG. 6 plots the normalized gain g of the converter circuit of FIG. 5 with respect to the switching frequency $f_s$. The problem of the converter is similar with the LC series resonance solution of FIG. 1. As illustrated, the curve peak shifts left as the load decreases, thus it is possible to fix a low end of the operating frequency range at, for example $f_{s,min}$. But because the gain curve is relatively flat to its right, a wide output range between "minimum gain" and "maximum gain" means the operating frequency could vary between about 25 kHz ($f_{s,min}$) and 900 kHz ($f_{s,max}$), presenting challenges both at the low end and the high end as discussed above in connection with FIGS. 1 and 2.

Figure 7:
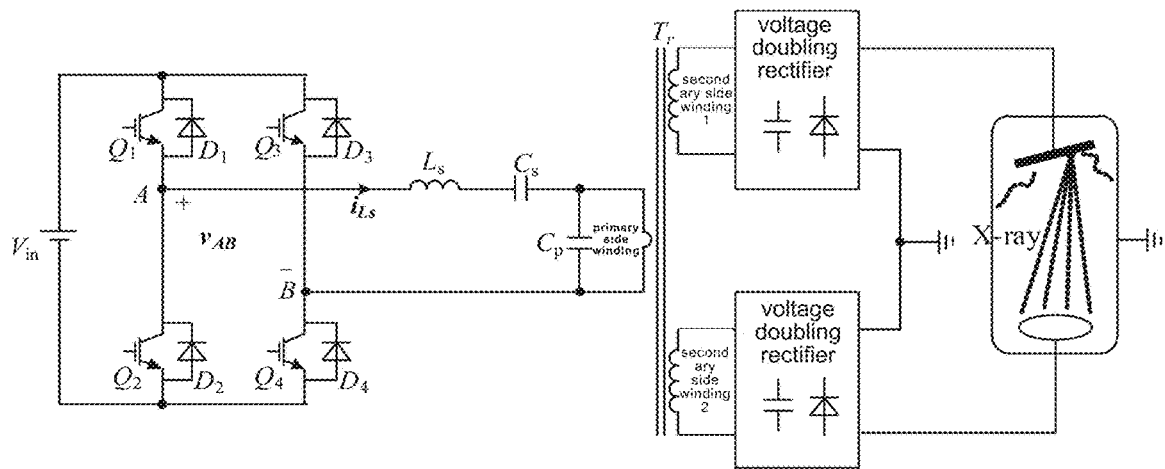
FIG. 7 illustrates a prior art LCC series-parallel resonance-based X-ray tube high voltage generator.
Figure 8:
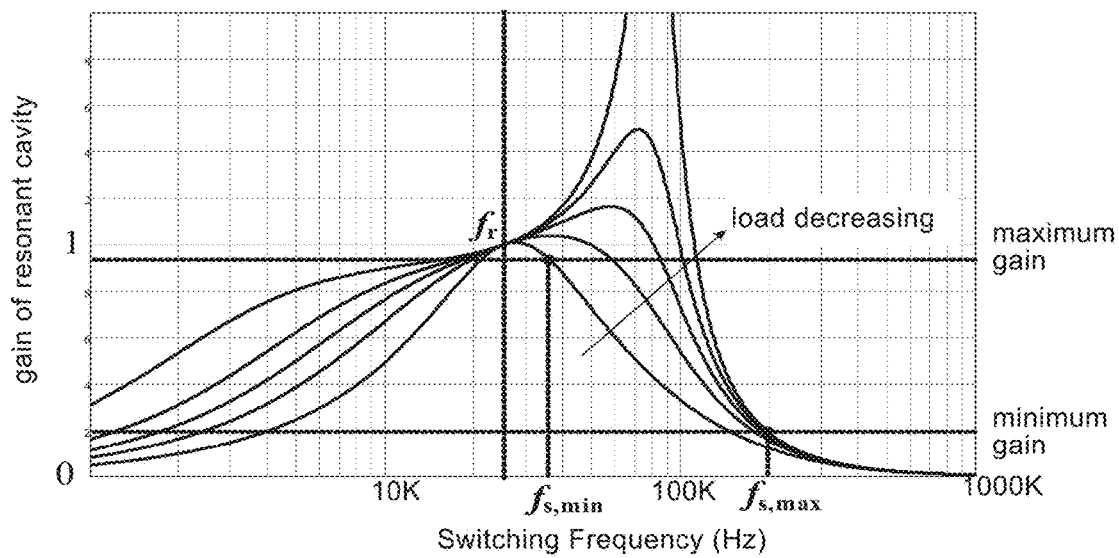
FIG. 8 illustrates the gain of the prior art X-ray tube high voltage generator of FIG. 7 with respect to the switching frequency.

FIG. 7 illustrates a prior art resonance-based X-ray tube high voltage generator, which differs from the circuits of FIGS. 1, 3, and 5, in that it includes an LCC series-parallel resonant circuit composed of a series inductor $L_s$, a series capacitor $C_s$, and a capacitor $C_p$ connected in parallel with the load. The normalized gain curve of the circuit of FIG. 7 with respect to the switching frequency $f_s$, as shown in FIG. 8, suggests essentially the same problems as those associated with the circuit of FIG. 3.

Because of the practical size limitation for a high voltage generator for use with X-ray tubes, the physical limits of IGBT switching transistors, and the desired gain for a wide output range, prior art circuits discussed above all fall short of satisfactory.

To address some or all the issues noted above in connection with prior art circuits, the present disclosure provides generator circuits with a wide output (or gain) range within a desired frequency range. A high voltage generator suitable for high power wide input and output range is provided. The high voltage generator includes an inverter circuit coupled to receive a direct-current (DC) input voltage, a resonant circuit coupled to the inverter circuit, a transformer coupled to the resonant circuit and also coupled to provide a high voltage output to a high voltage device, and a phase control circuit coupled to receive a voltage across and a current through the resonant circuit and also coupled to the inverter circuit to make sure that the switching frequency of the generator will not goes below the upper resonance peak produced by the series and the parallel resonant branch, and a limiter to make sure that the switching frequency of the generator will not goes beyond the lower resonance peak produced by the parallel resonant branch or the parallel LC in the series branch. With this main circuit configuration and control circuit, the generator will work between the upper resonance peak and the lower resonance peak to provide wide input and wide output power capability, i.e, the control signals drive the inverter circuit to keep the resonant circuit operating in an inductive region.

In one aspect, there are provided generators based on a resonant circuit with two resonant frequencies. The two resonant frequencies define a steep gain curve therebetween, thereby providing for a wide range of output within a narrow frequency range neither too low nor too high. In another aspect of the present disclosure, there are provided generators with an amplitude limiting circuit that effectively limits the highest operating frequency to avoid unstable areas near the higher of the two resonant frequencies. In a further aspect, there are provided generators with a phase control circuit that ensures that the generator operate on the right side of the peak of the gain curve to avoid problems associated with low-frequency operations. Examples are provided below to illustrate these various aspects.

Embodiment 1

Figure 9:
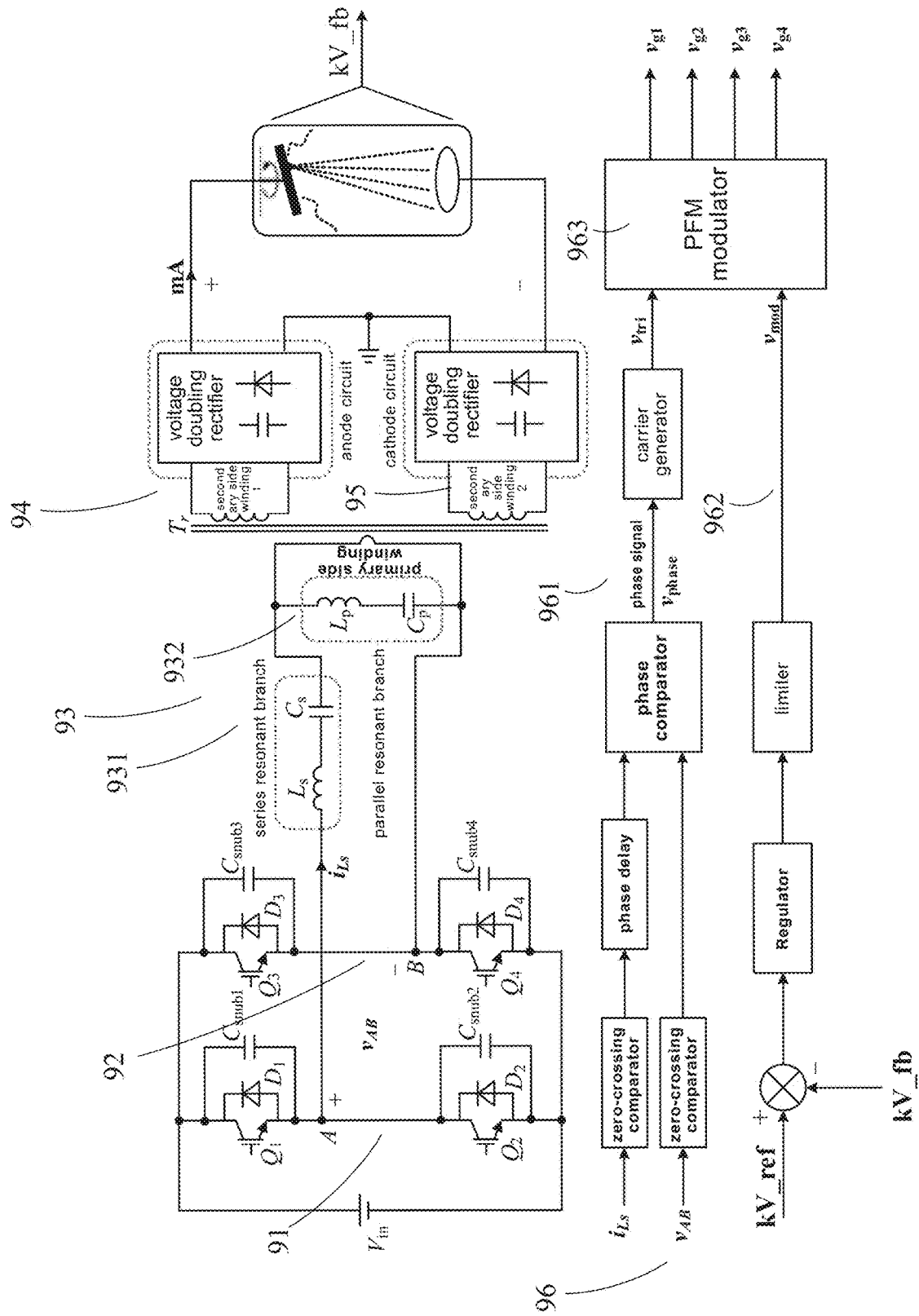
FIG. 9 illustrates a high voltage generator consistent with the present disclosure.

Consistent with Embodiment 1 of the present disclosure, FIG. 9 illustrates a resonant converter including an inverter circuit based on a series-parallel LCLC resonant circuit 93. LCLC resonant circuit 93 includes a series resonant branch 931 and a parallel resonant branch 932. Series resonant branch 931 includes a series inductor $L_s$ and a series capacitor $C_s$. Parallel resonant branch 932 includes a parallel inductor $L_p$, and a parallel capacitor $C_p$. The parallel inductor $L_p$ is serially connected to the parallel capacitor $C_p$, and the two are connected in parallel with the load.

A DC power source $V_{in}$ is provided to LCLC resonant circuit 93 through an inverter bridge. In the non-limiting example of FIG. 9, the inverter bridge consists of an H bridge composed of four switch transistors $Q_1$, $Q_2$, $Q_3$, and $Q_4$, and four diodes $D_1$, $D_2$, $D_3$, and $D_4$ connected anti-parallel across the switch transistors. The switch transistors may be, for example, triodes, field effect transistors such as MOSFETs, or junction or insulated gate bipolar transistors (IGBT). IGBT transistors, for example, provide for high switching frequency, low loss, and stable output voltage. In the exemplary embodiment, capacitors $C_{snub1}$-$C_{snub4}$ are coupled in parallel with the switch transistors to further reduce switching loss.

First switch transistor $Q_1$ and second switch transistor $Q_2$ are coupled in series, i.e., the emitter of first switch transistor $Q_1$ is coupled to the collector of second switch transistor $Q_2$, to form a first bridge leg (the leading leg) 91. Third switch transistor $Q_3$ and fourth switch transistor $Q_4$ are coupled in series, i.e., the emitter of third switch transistor $Q_3$ is coupled to the collector of fourth switch transistor $Q_4$, to form a second bridge leg (the lagging leg) 92. First bridge leg 91 and second bridge leg 92 are coupled in parallel and both are connected to power source $V_{in}$. The emitter of first switch transistor $Q_1$ and the collector of second switch transistor $Q_2$ are further coupled to the midpoint A of bridge leg 91. The emitter of third switch transistor $Q_3$ and the collector of fourth switch transistor $Q_4$ are further coupled to the midpoint B of bridge leg 92. First bridge leg 91 constitutes an anode inverter bridge or an anode voltage terminal of the high voltage generator, while second bridge leg 92 constitutes a cathode inverter bridge or a cathode terminal of the high voltage generator.

The switch transistors are turned on and off by control signals provided to the gates thereof, thereby providing AC voltage $v_{AB}$ between midpoints A and B with a switching frequency $f_s$ corresponding to the control signals. In one aspect, the control signals are PFM signals. The AC voltage $v_{AB}$ is applied to the LCLC resonant circuit, which is connected to the primary side of a transformer $T_r$. Transformer $T_r$ transforms the AC voltage $v_{AB}$ to a higher AC voltage through the coupling between its primary and secondary windings. On the right side, the higher AC output voltage at the secondary windings is rectified by two voltage doubling rectifiers 94 and 95 into a high-power DC voltage kV_fb, which is then supplied to the X-ray tube. The transformer associated with the cathode and the transformer associated with the anode may take the form of primary side windings in parallel or may take the form of two primary side windings in series. Transformer $T_r$ may have separate cathode and anode or may have integrated cathode and anode. Although not shown, transformer $T_r$ may also have parasitic inductance $L_{lk}$ and parasitic capacitance $C_w$.

Voltage doubling rectifiers 94 and 95 are both to ground, and the output of voltage doubling rectifier 94 is connected to the anode of the X-ray tube, while the output of voltage doubling rectifier 95 is connected to the cathode of the X-ray tube. The transformer $T_r$, the X-ray tube, and the circuitry between the two constitute the load to the inverter circuit.

Figure 10:
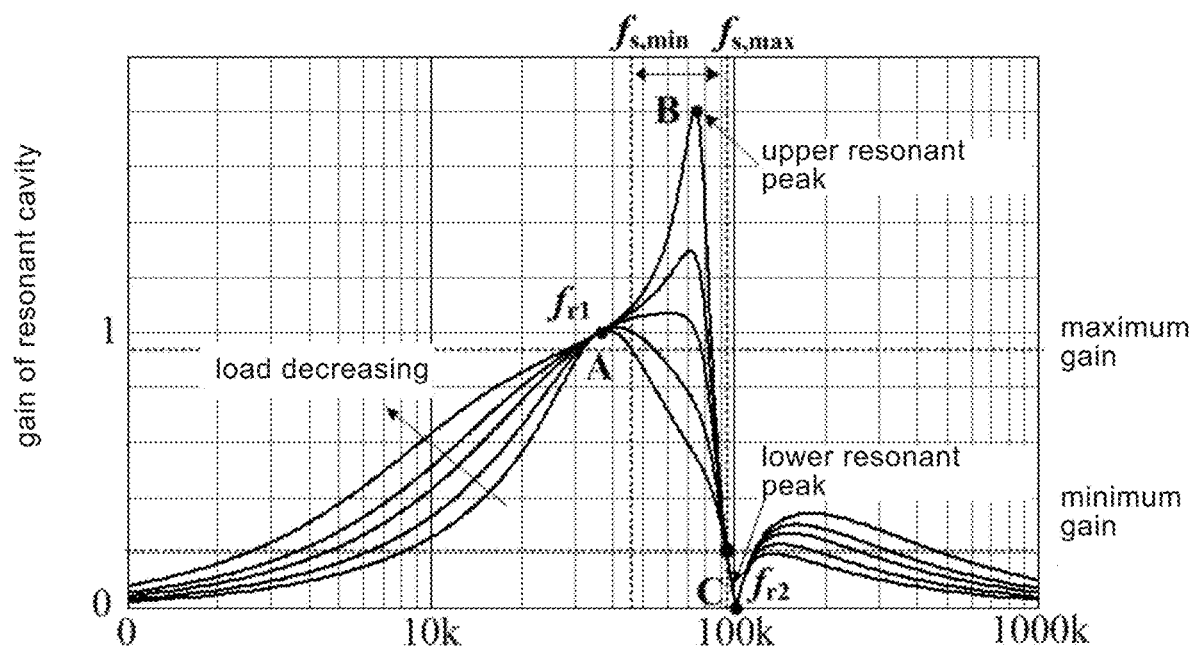
FIG. 10 illustrates the gain of the high voltage generator of FIG. 9 with respect to the switching frequency.

FIG. 10 plots the normalized gain g of the resonant converter circuit in FIG. 9 with respect to the switching frequency $f_s$. The gain g is plotted along the vertical axis as a measurement of the output voltage as compared to the input voltage and normalized to the maximum output to input ratio, and thus varies between 0 and 1. The switching frequency $f_s$ is plotted along the lateral axis in logarithm scale. As illustrated in FIG. 10, the series and parallel inductors and capacitors define two resonant frequencies, a higher, series resonant frequency $f_{r1}$ and a lower, parallel resonant frequency $f_{r2}$. Series resonant frequency $f_{r1}$ is defined by the inductance $L_s$ and capacitance $C_s$, i.e., $$\frac{1}{2\pi\sqrt{L_r C_r}}.$$

For example, if $L_s$=20 μH and $C_s$=1 μF, then $f_{r1}$≈36 kHz. Parallel resonant frequency $f_{r2}$ is defined by the inductance $L_p$ and capacitance $C_p$, i.e., $$\frac{1}{2\pi\sqrt{L_p C_p}}.$$

For example, if $L_p$=20 μH and $C_p$=125 nF, then $f_{r2}$≈100 kHz. Because of the load to the resonant circuit varies, both the series and parallel resonant frequency vary too and shift to the right and rise as the load decreases.

As noted above, operations to the left side of the peak of the gain curve may be challenging because lower frequencies generally mean a large size or volume of the device, and the switch transistors become unstable at high frequencies (for example IGBTs becoming unstable at higher frequencies than 100 kHz). Consistent with embodiments of the present disclosure, there is further provided a control circuit that automatically limits the operation frequency to be between the peak of the gain curve and the parallel resonant frequency (about 100 kHz in the example given above).

As an example, bottom half of FIG. 9 shows a control circuit 96 including a phase control branch 961 and an amplitude control branch 962. The phase control branch 961 receives, as inputs, current $i_{LS}$ through the series resonant branch and AC voltage $v_{AB}$ and detects the phases of the two using two zero-crossing comparators. A phase delay delays the detected phase of current $i_{LS}$, and then a phase comparator compares the delayed current phase with the detected phase of $v_{AB}$. The resultant phase comparison signal $v_{phase}$ is applied to a carrier frequency generated by a carrier generator, resulting in a first modulated voltage signal $v_{tri}$ that is then provided to a PFM modulator 963.

The amplitude control branch 962 compares the high-power DC voltage kV_fb with a reference voltage kV_ref and, through a regulator and a limiter, generates a second modulated voltage signal $v_{mod}$ to limit the amplitude of the high-power DC voltage kV_fb.

Based on first modulated voltage signal $v_{tri}$ and second modulated voltage signal $v_{mod}$, PFM modulator 963 generates gate control signals, or driving signals, $v_{g1}$, $v_{g2}$, $V_{g3}$, and $v_{g4}$, which are provided to the gates of switch transistors $Q_1$, $Q_2$, $Q_3$, and $Q_4$ to switch them on and off. Alternatively, PFM modulator 963 may be coupled to a driver, in which case PFM modulator 963 may generate intermediate signals and the driver may then generate the gate control signals. Even though FIG. 9 shows four outputs from PFM modulator 963, they may be provided on two output terminals, where driving signals $v_{g1}$ and $v_{g3}$ may be provided on one terminal and driving signals $v_{g2}$ and $v_{g4}$ may be provided on the other terminal.

In one aspect, PFM modulator 963 may comprise a comparator. First modulated voltage signal vtri may be a periodic sawtooth wave with a fixed slope. When vtri reaches the same amplitude as second voltage modulation signal vmod, the polarity of the gate control signals is flipped. Chinese Patent No. CN106358354A may be referred to for more details of an exemplary circuit architecture of PFM modulator 963. The polarity of vg1-vg4 may change in accordance with the polarity of the driving signal.

In operation, generation of gate control signals $v_{g1}$, $v_{g2}$, $V_{g3}$, and $v_{g4}$ based on phase comparison signal $V_{phase}$ and modulated voltage signal $v_{tri}$ ensures that voltage $v_{AB}$ always leads current $i_{LS}$ in phase, and thus guarantees that circuit operates on the right side of the peak of the gain curve. Particularly, the peak of the gain curve defines the boundary between the impedance of the resonant circuit, as loaded, being capacitive versus being inductive, where the resonant circuit is capacitive on the left side of the peak and inductive on the right side. Operating the circuit in the inductive region, meaning that the phase of current $i_{Ls}$ lags voltage $v_{AB}$, can achieve zero-voltage switching (ZVS) and improve efficiency. Operating in the capacitive region, on the other hand, can lead to reverse recovery loss and noise, high current spikes, and even device faults. In accordance with an exemplary embodiment, the amount of the phase delay between voltage $v_{AB}$ and current $i_{Ls}$ may be configured, by varying parameters or operations of phase control branch 961, to provide a desired safety margin (for example at least 5° of phase delay) from the peak of the gain curve, regardless of the load. As an alternative to zero-crossing comparators, maintenance of the lead of the phase of voltage $v_{AB}$ as compared to that of current $i_{Ls}$ can also be achieved with phase-lock loop (PLL) or other commonly known phase control circuits.

The phase comparison and control mechanism shown in FIG. 9 and described herein do not depend on the load, but rather automatically track the peak of the gain curve even when the load changes, such that the circuit always operates on the right side of the peak even when the peak shifts with the load. In addition, generation of gate control signals $v_{g1}$, $v_{g2}$, $V_{g3}$, and $v_{g4}$ based on voltage modulation signal $v_{mod}$ prevents the output high power DC voltage from dropping down below a threshold corresponding to the minimum gain, and thus prevents the operation frequency from going above a certain high limit, for example, 100 kHz.

Figure 11:
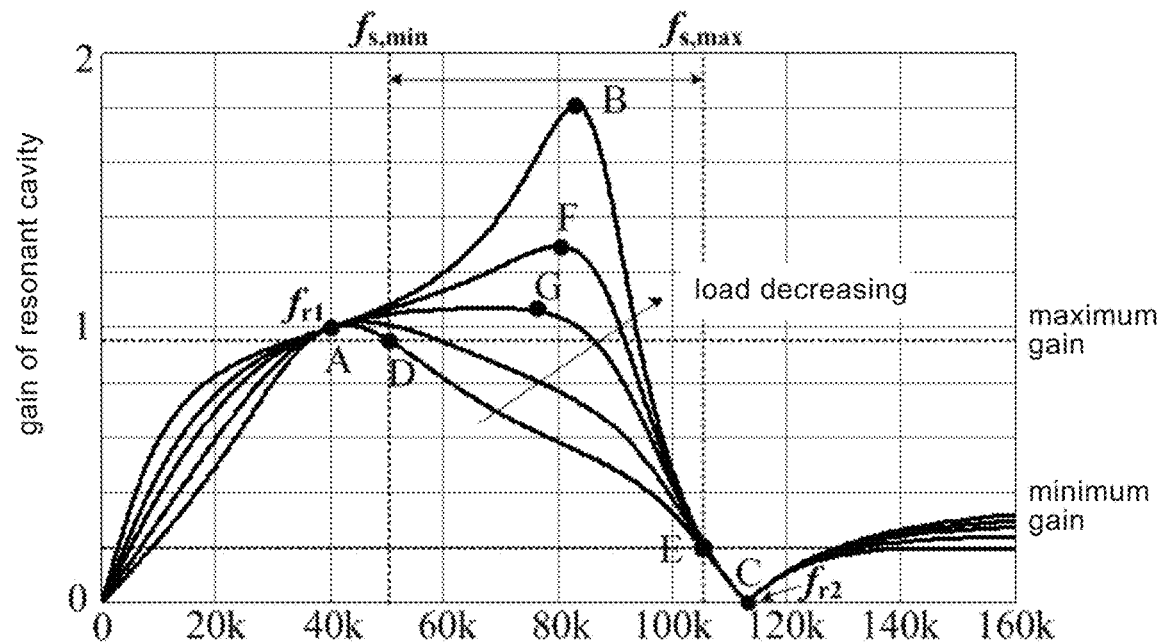
FIG. 11 is an expanded view of FIG. 10.

FIG. 11 is an expanded view of FIG. 10 to illustrate the range of operation frequency of the resonant converter shown in FIG. 9. In this example, the high end of the range is at about 105 kHz. The low end of the range is at about 50 kHz for a heavy load and may rise to about 83 kHz with a light load.

Figure 12:
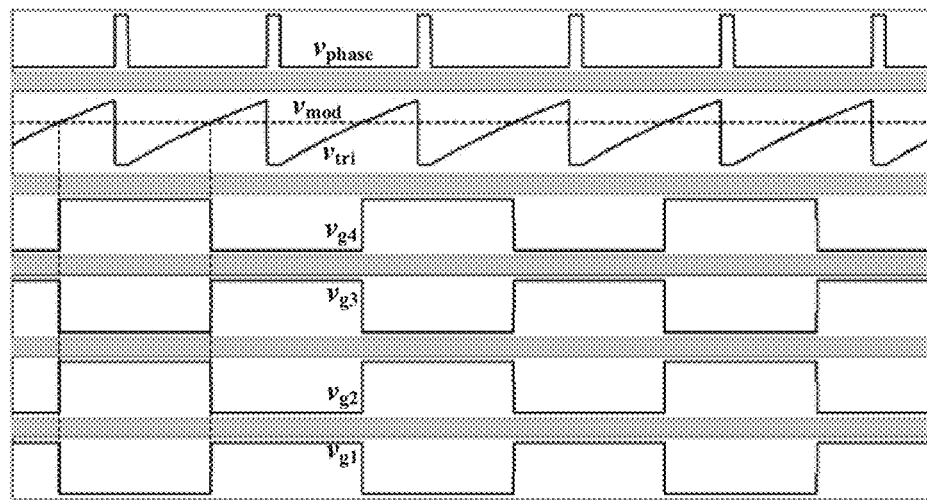
FIG. 12 illustrates exemplary waveforms of several signals of the high voltage generator of FIG. 9.

FIG. 12 depicts exemplary waveforms of signals $V_{phase}$, $V_{tri}$, $V_{mod}$, and $v_{g1}$-$v_{g4}$. Phase signal $V_{phase}$ represents when voltage $v_{AB}$ leads current $i_{Ls}$ in phase and $v_{tri}$ (the periodic sawtooth wave) starts to integrate over time when $v_{AB}$ no longer leads current $i_{Ls}$. Thus, the faster voltage $v_{AB}$ loses phase lead over current $i_{Ls}$, the shorter the period of $v_{tri}$ and the higher the frequency of $v_{tri}$ must be. Then, PFM modulator 963 compares $v_{tri}$ with $v_{mod}$ (the constant dashed line), and every time $v_{tri}$ intersects with $v_{mod}$ on its rising edge, the polarities of gate control signals $v_{g1}$-$v_{g4}$ are reversed. Thus, the higher $v_{mod}$ becomes, i.e., the closer output voltage kV_fb approaches kV_ref, the longer the period of $v_{tri}$ and the lower the frequency of $v_{tri}$ must be. Through the combination of these two control mechanisms, it can be ensured that the resonant converter operates within the narrow frequency range between the peak of the gain curve and the upper frequency limit of the switching transistors.

Figure 13:
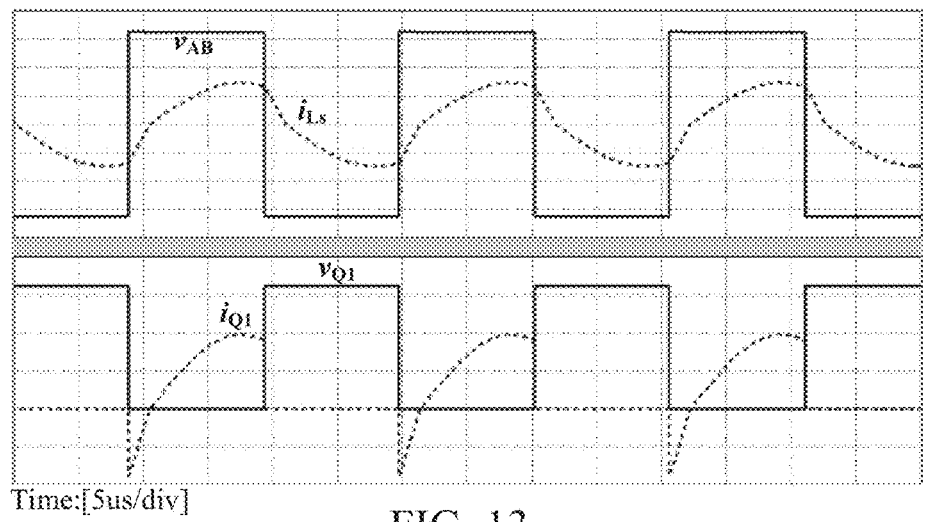
FIG. 13 illustrates exemplary waveforms of several signals of the high voltage generator of FIG. 9 when heavily loaded.

FIG. 13 illustrates exemplary waveforms of the LCLC series-parallel resonant circuit with a heavy load. In particular, FIG. 13 illustrates waveforms of $v_{AB}$ and $i_{Ls}$ in one graph and waveforms of $v_{Q1}$ and $i_{Q1}$ (voltage and current of $Q_1$) in another graph, when the output voltage is 140 kV, load current is 350 mA, and the operating frequency is 48 kHz. As can be seen from the figure, the phase of current $i_{Ls}$ lags the phase of voltage $v_{AB}$, meaning the circuit operates in the inductive region, i.e., on the right side of the peak of the gain curve. Moreover, current $i_{Q1}$ is negative before $Q_1$ is turned on, and the presence of parallel diode $D_1$ ensures zero-voltage switching (ZVS) of $Q_1$.

Figure 14:
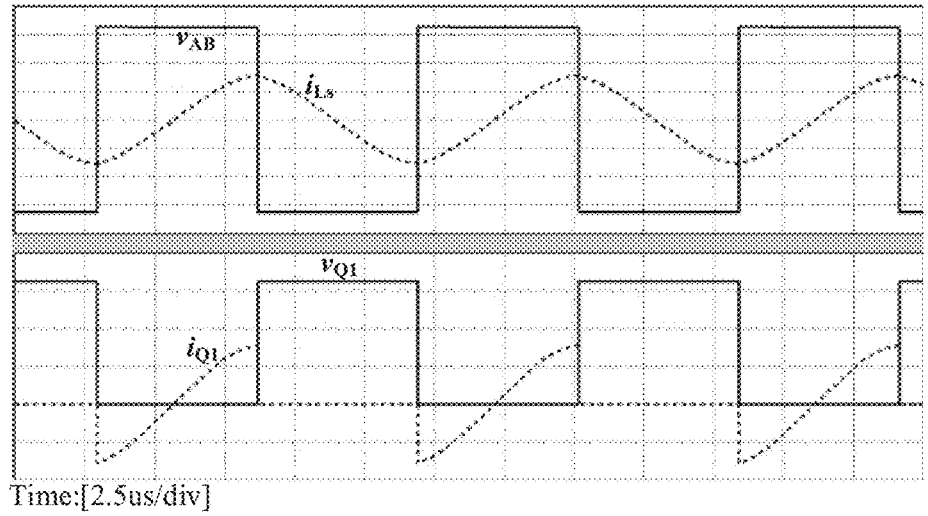
FIG. 14 illustrates exemplary waveforms of several signals of the high voltage generator of FIG. 9 when heavily loaded.

FIG. 14 illustrates exemplary waveforms of the LCLC series-parallel resonant circuit, similar to those shown in FIG. 13, but with a light load, when the output voltage is 140 kV, load current is 10 mA. The operating frequency is now 87 kHz. As can be seen from the figure, current $i_{Ls}$ still lags voltage $v_{AB}$ and current $i_{Q1}$ is still negative before $Q_1$ is turned on. Therefore, the control mechanisms illustrated in FIG. 9 and described herein ensure zero-voltage switching and operation in a narrow frequency range, whether the load is heavy or light, which guarantees the reliability and low switching loss of the switch transistor.

Figure 15:
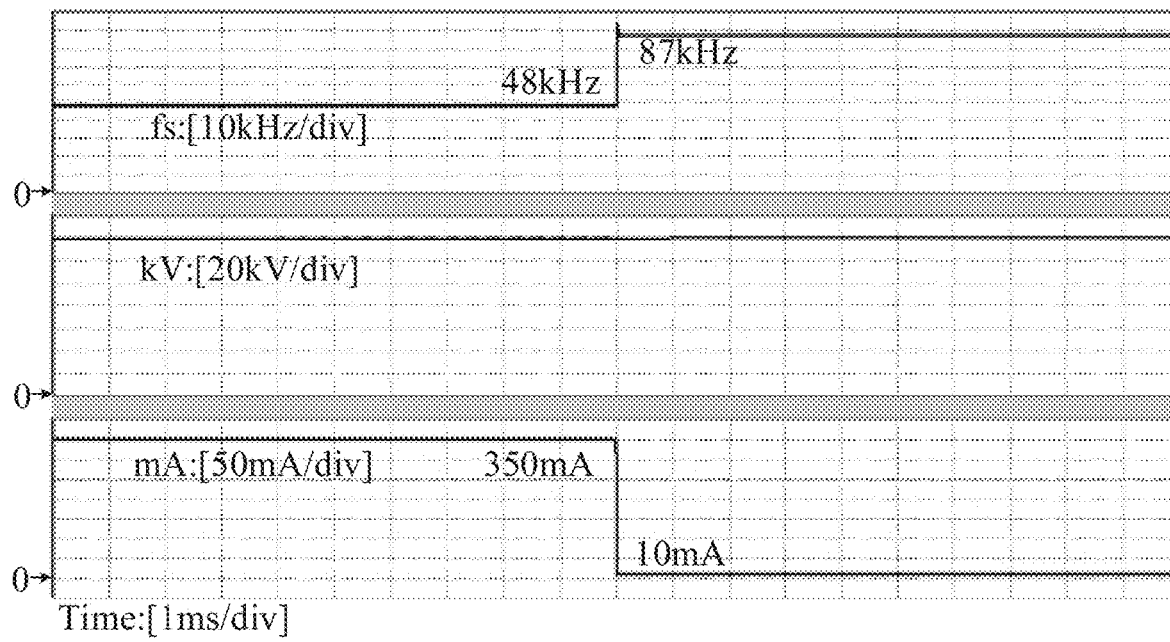
FIG. 15 illustrates changes in switching frequency, output voltage, and load current of the high voltage generator of FIG. 9 when the load is switched from heavy to light, consistent with the present disclosure.
Figure 16:
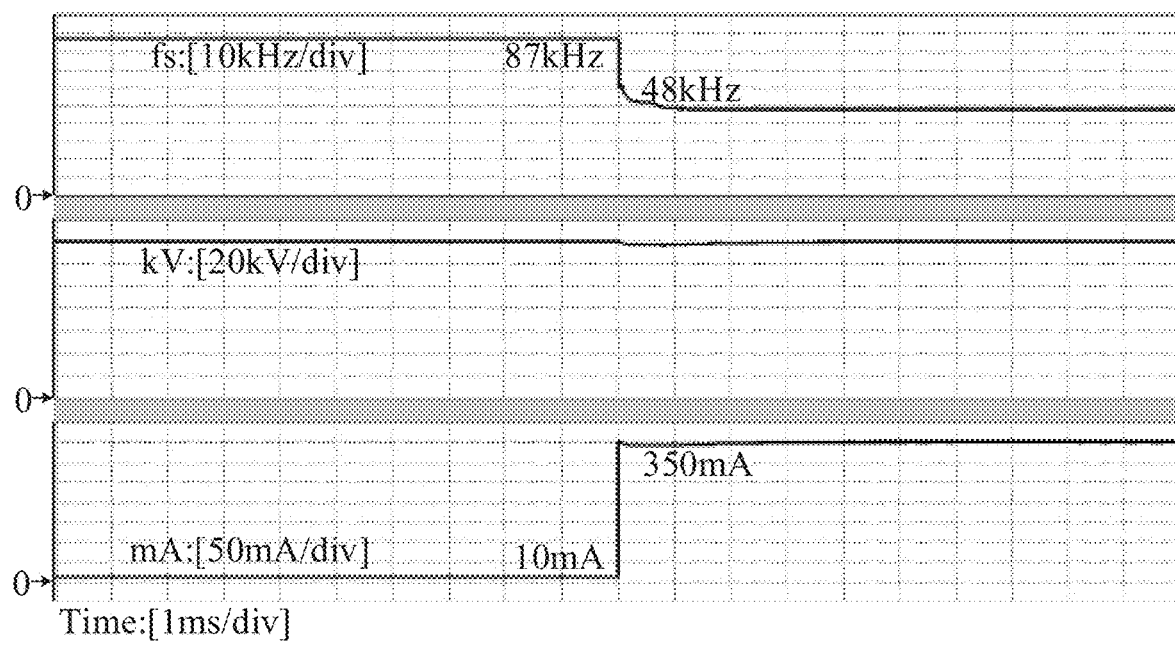
FIG. 16 illustrates changes in switching frequency, output voltage, and load current of the high voltage generator of FIG. 9 when the load is switched from light to heavy, consistent with the present disclosure.

FIGS. 15-16 illustrate changes in switching frequency $f_s$, output voltage, and load current of the LCLC series-parallel resonant circuit of FIG. 9 as the load changes. In particular, FIG. 15 illustrates the changes as the load is switched from heavy to light, and FIG. 16 illustrates the changes as the load is switched from light to heavy. In FIG. 15, the load changes from heavy to light, e.g., the load current changes from 350 mA to 10 mA. As discussed above, when the load decreases, the peak of the gain curve shifts to the right, i.e., the corresponding frequency increase. As shown in the figure, the operating frequency increase from 48 kHz to 87 kHz as the load decreases, while staying below the second resonant frequency of about 100 kHz. Likewise, as shown in FIG. 16, when the load increases, e.g., the load current changes from 10 mA to 350 mA, because the peak of the gain curve shifts to the left, the operating frequency also drops, from 87 kHz to 48 kHz.

Embodiment 2

Figure 17:
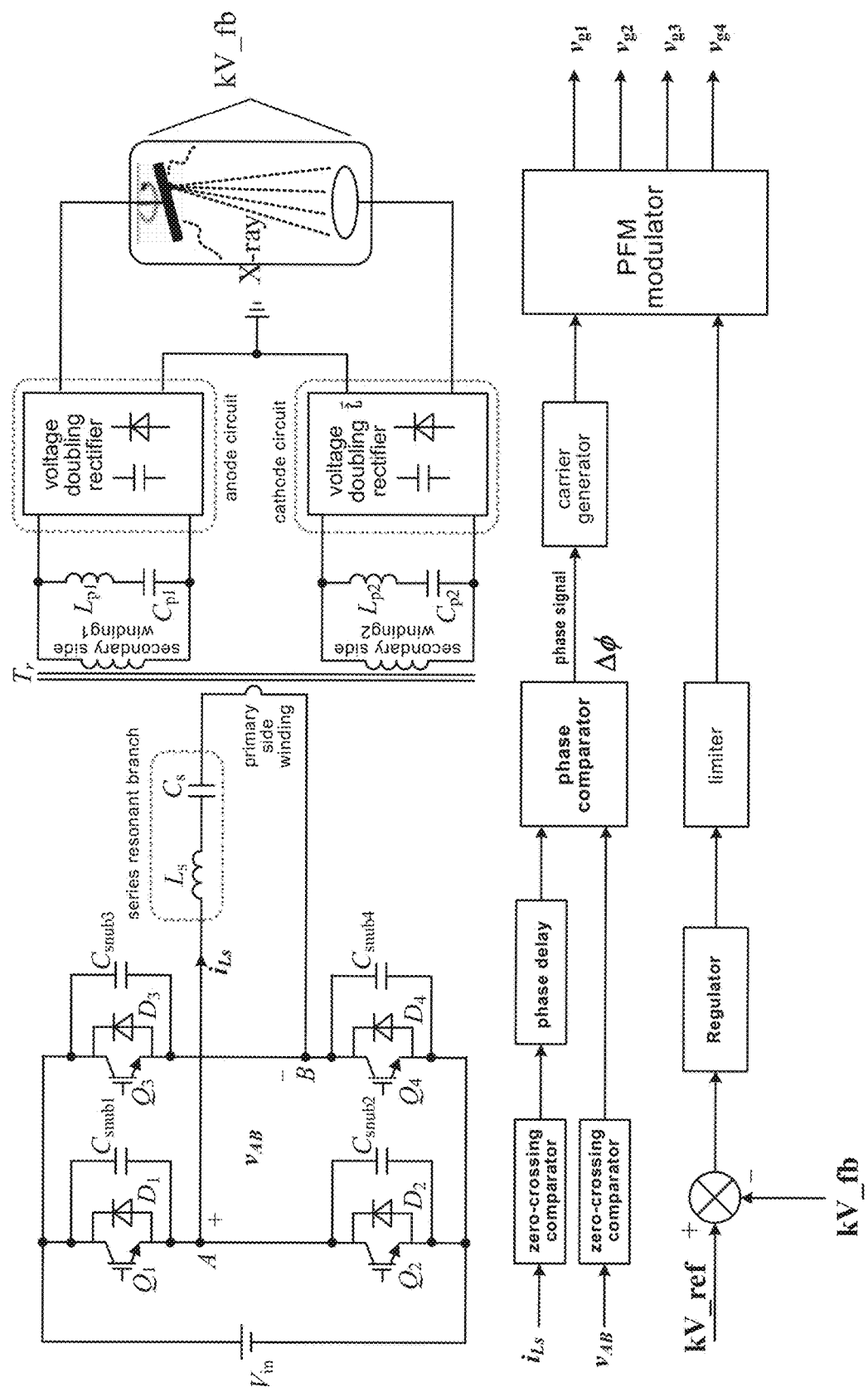
FIGS. 17-21 illustrate alternative embodiments consistent with the present disclosure.

FIG. 17 illustrates a resonant converter circuit of an X-ray tube high voltage generator consistent with Embodiment 2 of the present disclosure. The X-ray tube high voltage generator comprises an inverter bridge, a resonant circuit, a transformer, a voltage doubling rectifier circuit, and a control circuit. Compared to Embodiment 1 of FIG. 9, the resonant circuit of Embodiment 2 also includes a series resonant branch 931 and a parallel resonant branch 932; but, instead of parallelly coupled to the primary windings of Transformer $T_r$, parallel resonant branch 932 includes serially connected inductor $L_{p1}$ and capacitor $C_{p1}$ further connected in parallel with secondary winding 1 and serially connected inductor $L_{p1}$ and capacitor $C_{p1}$ further connected in parallel with secondary winding 2. The resonant converter circuit of Embodiment 2 operates in a similar fashion as that of Embodiment 1, with more relaxed circuit requirements of the resonant branches.

Embodiment 3

Figure 18:
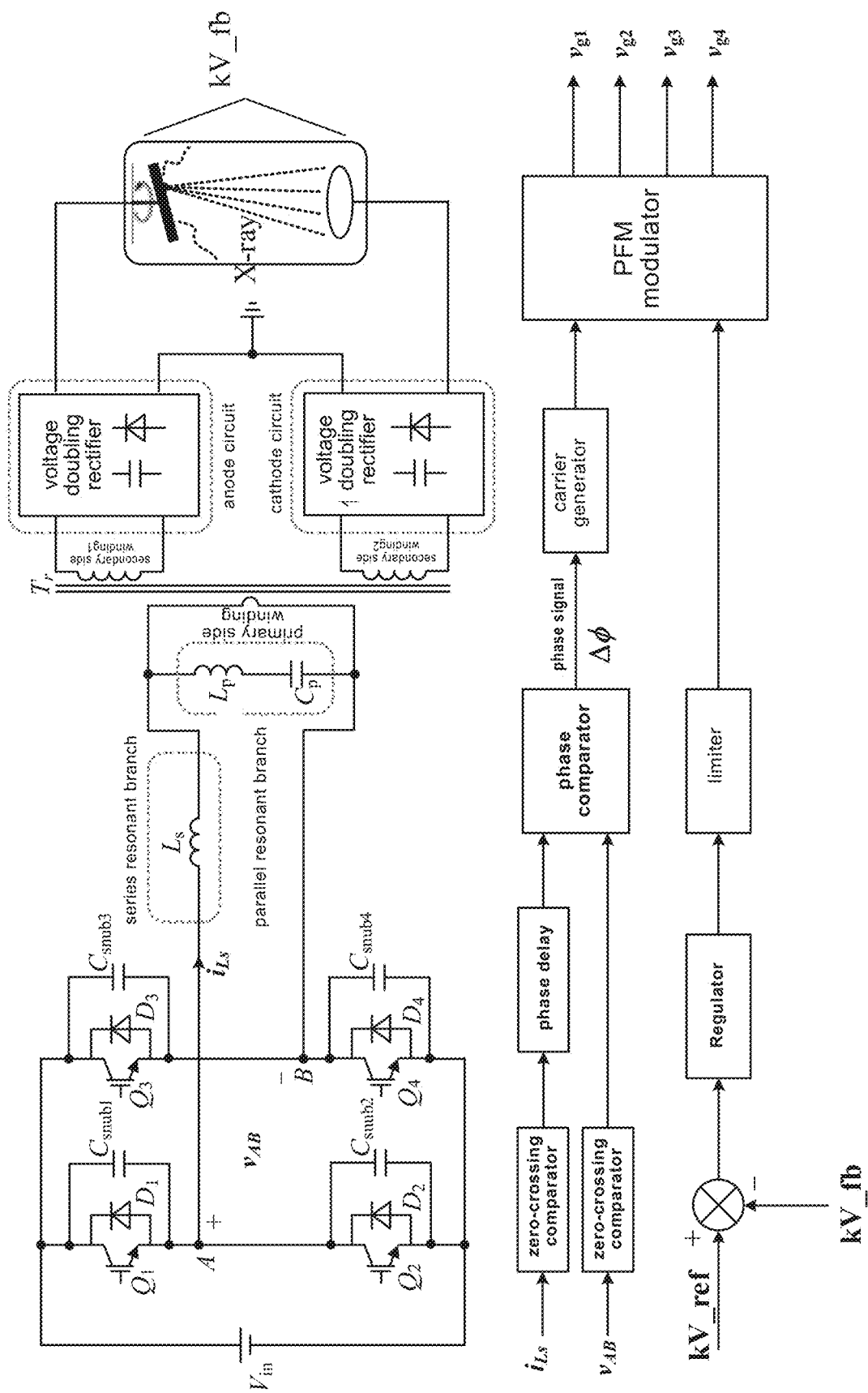

FIG. 18 illustrates a resonant converter circuit of an X-ray tube high voltage generator according to Embodiment 3 of the present disclosure. The X-ray tube high voltage generator comprises an inverter bridge, a resonant circuit, a transformer, a voltage doubling rectifier circuit, and a control circuit. Compared to Embodiments 1 and 2, series resonant branch 931 only comprises a series resonant capacitor $C_s$. Even though parallel resonant branch 932 is shown to be coupled in parallel with the primary windings of transformer $T_r$, the configuration of parallel resonant branch 932 of Embodiment 2 may be adopted as well.

Embodiment 4

Figure 19:
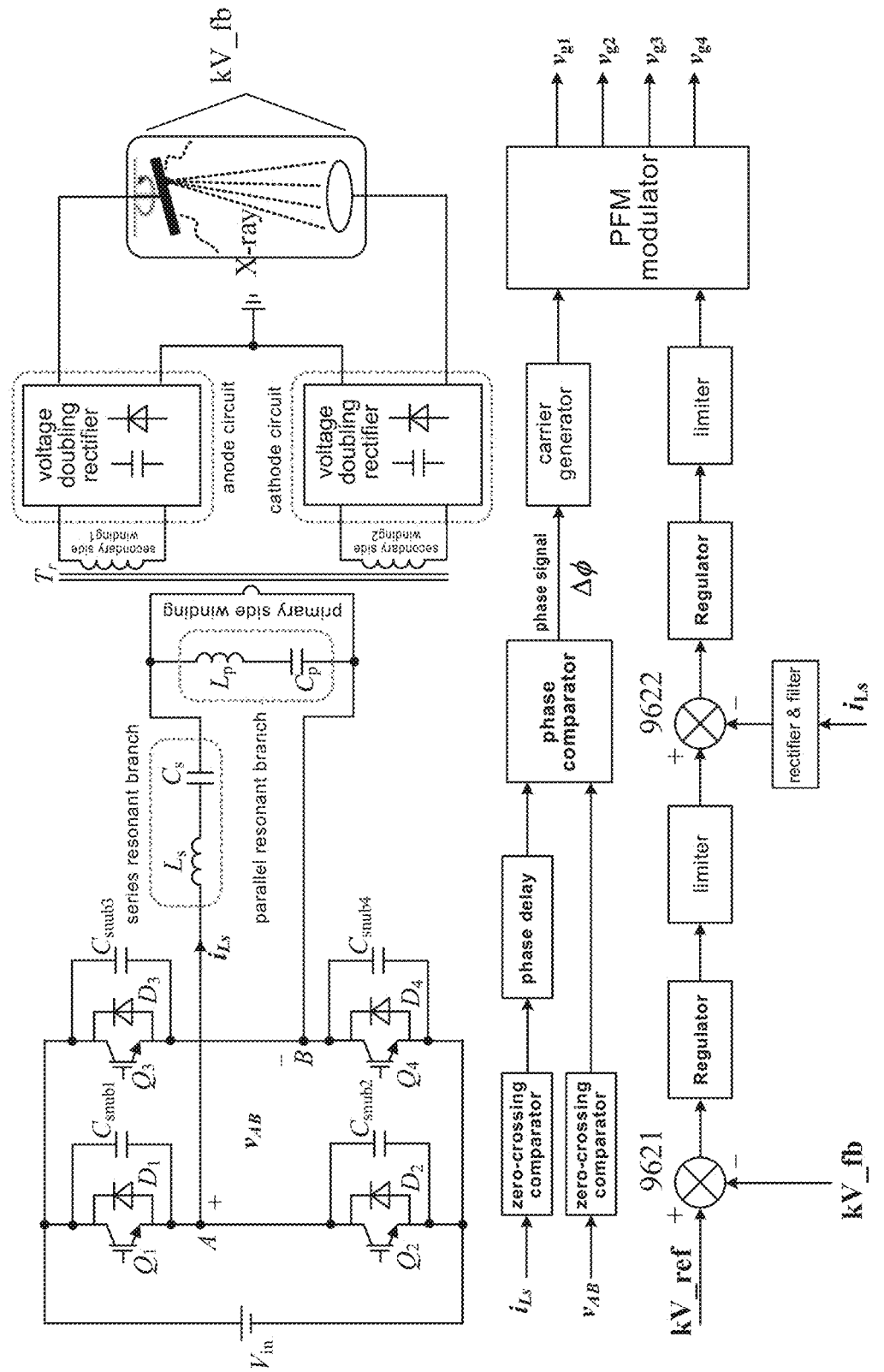

FIG. 19 illustrates a resonant converter circuit of an X-ray tube high voltage generator according to Embodiment 4 of the present disclosure. The X-ray tube high voltage generator comprises an inverter bridge, a resonant circuit, a transformer, a voltage doubling rectifier circuit, and a control circuit. Compared to Embodiment 1 of FIG. 9, amplitude control branch 962 further includes a current limiter that limits the current $i_{Ls}$ through the inverter bridge.

Exemplarily, the second control branch 962 may receive a voltage feedback signal from the load and a current feedback signal from the output of the inverter, respectively. A second control signal is generated based on the current feedback signal and the voltage feedback signal.

A first adder 9621 receives as input the voltage feedback signal from the X-ray high voltage generator and a reference voltage and calculates the voltage difference between the two. The voltage difference regulated at the regulator and then proportionally integrated by the limiter to generate an output of a partially modulated voltage.

A second adder 9622 receives the partially modulated voltage as one input and current $i_{Ls}$ from the inverter bridge after rectification and filtering. Second adder 9622 calculates the difference value between the load current and the first feedback current $i_{Ls}$; the regulator 2 is a current regulator, which performs a proportional integral operation on the difference value to output another partially modulated voltage. These two partially modulated voltages are both applied to the PWM modulator to produce a second control signal. The embodiment utilizes a double closed-loop control for voltage and current, which does not affect the mode switching process and may improve the control characteristics of the inverter circuit.

Embodiment 5

Figure 20:
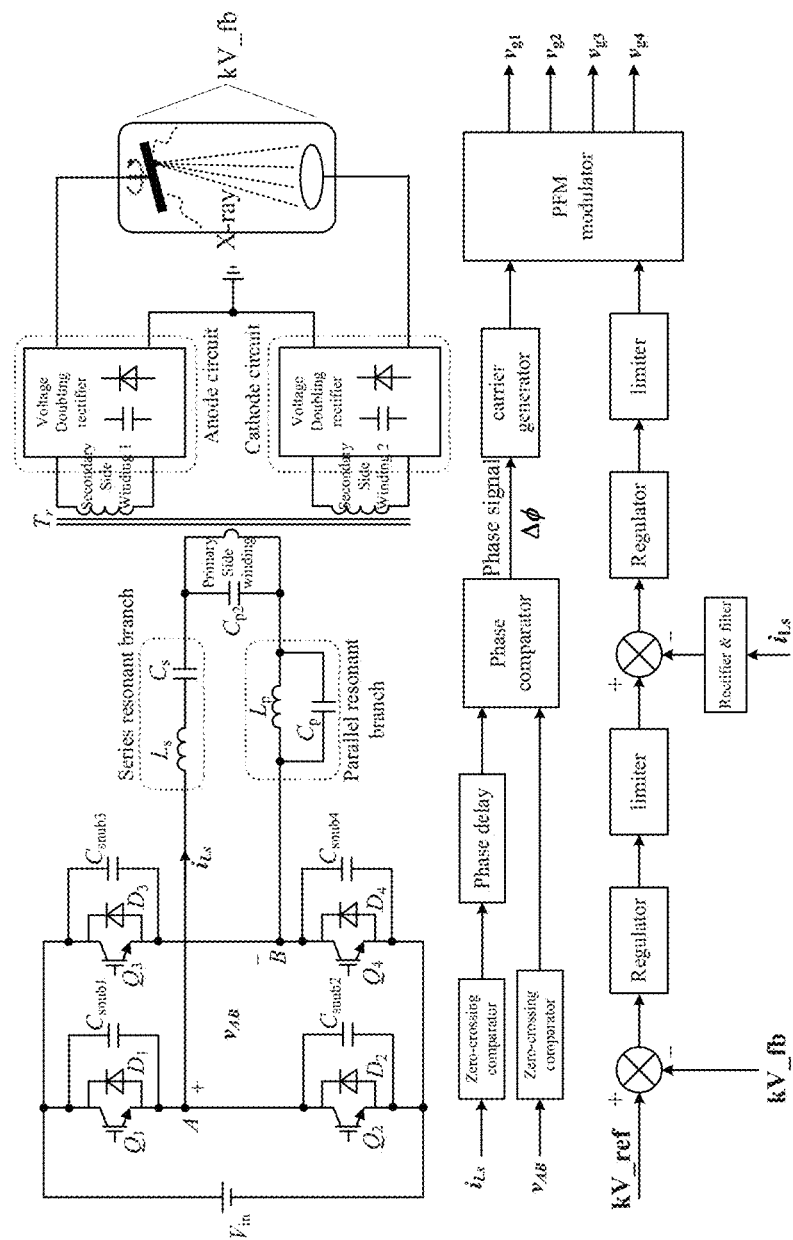

FIG. 20 illustrates a resonant converter circuit of an X-ray tube high voltage generator according to Embodiment 5 of the present disclosure. The X-ray tube high voltage generator comprises an inverter bridge, a resonant circuit, a transformer, a voltage doubling rectifier circuit, and a control circuit. Compared to Embodiment 4 of FIG. 19, the resonant circuit includes serially connected series inductor $L_s$ and capacitor $C_s$, parallelly connected inductor $L_p$ and capacitor $C_p$, and another capacitor $C_{p2}$ parallelly coupled to the primary windings of transformer $T_r$.

Embodiment 6

Figure 21:
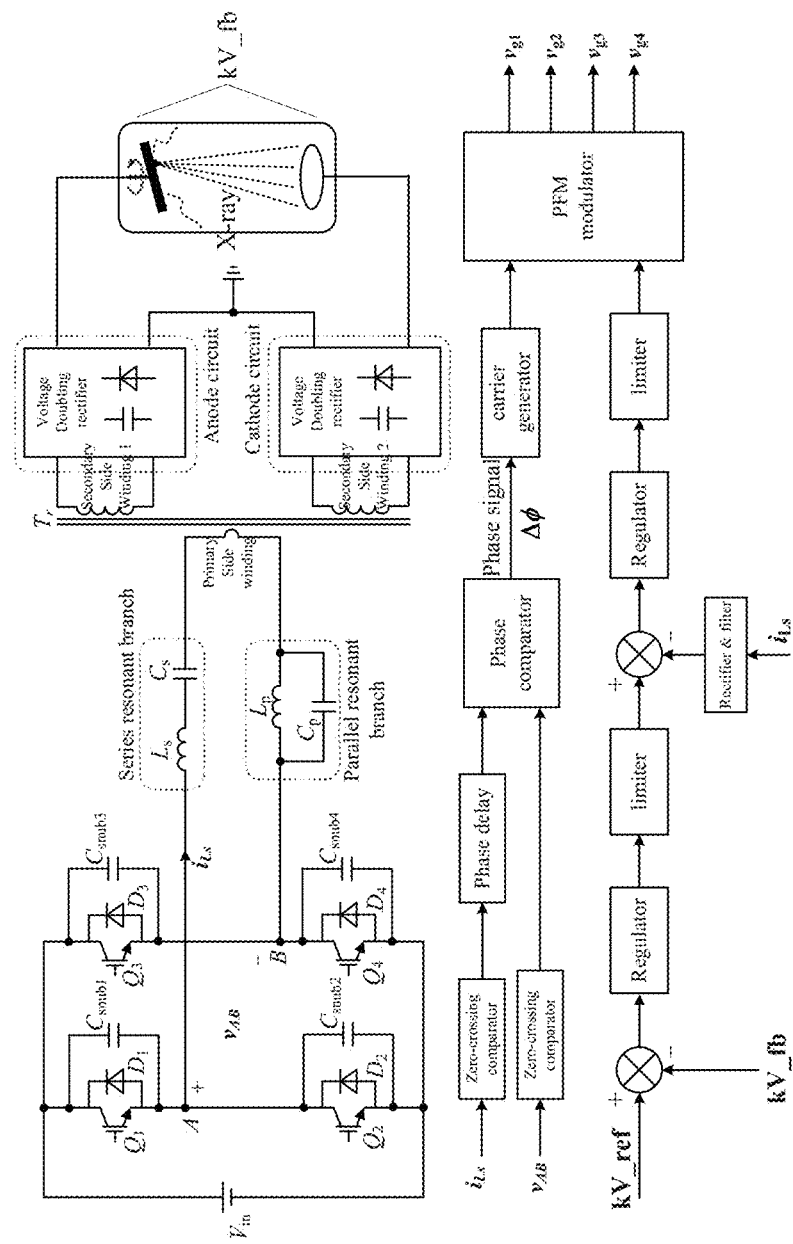

FIG. 21 illustrates a resonant converter circuit of an X-ray tube high voltage generator according to Embodiment 6 of the present disclosure. The X-ray tube high voltage generator comprises an inverter bridge, a resonant circuit, a transformer, a voltage doubling rectifier circuit, and a control circuit. Compared to Embodiment 5 of FIG. 20, the resonant circuit includes serially connected series inductor $L_s$ and capacitor $C_s$, and parallelly connected inductor $L_p$ and capacitor $C_p$, but does not include capacitor $C_{p2}$ parallelly coupled to the primary windings of transformer $T_r$.

Figure 22:
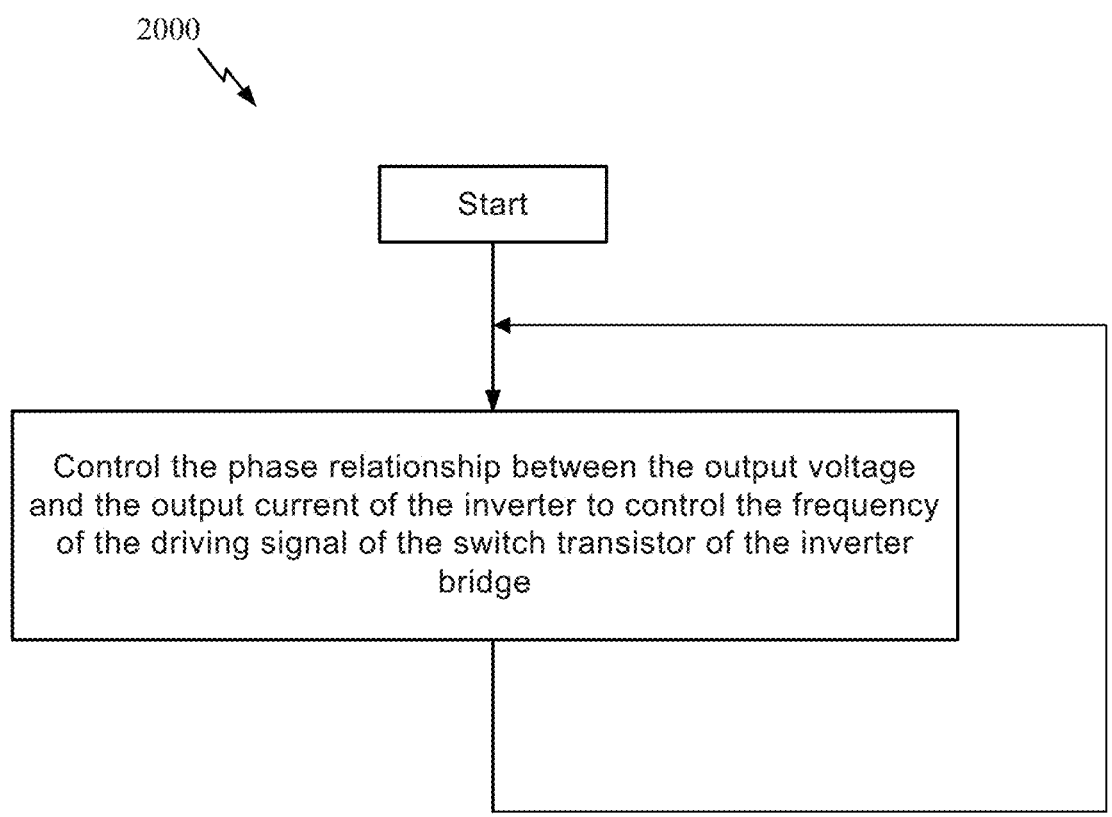
FIG. 22 illustrates a method for controlling a resonant converter consistent with the present disclosure.

FIG. 22 illustrates a method 2000 for controlling a high voltage generator consistent with the present disclosure. In accordance with an exemplary embodiment, the high voltage generator may comprise an inverter, such as an inverter bridge. The inverter bridge comprises a first bridge leg and a second bridge leg, and the first bridge leg or the second bridge leg comprises at least two switch transistors distributed in series. The high voltage generator further comprises: a first resonant branch, the first resonant branch being coupled in series to the output of the first bridge leg; a transformer, the transformer being coupled between the output of the first resonant branch and the output of the second bridge leg; a second resonant branch, the second resonant branch being coupled in parallel to the transformer; a rectifier circuit, the rectifier circuit being coupled with the output of the transformer for providing output voltage to the X-ray generating device. Moreover, the first resonant branch may determine a first switching frequency of the switch transistor, and the second resonant branch may determine a second switching frequency of the switch transistor. By controlling the driving signals, the switch transistor may operate between the first switching frequency and the second switching frequency. Those of skill in the art will appreciate that this is just an exemplary embodiment of a high voltage generator, and the method may apply to the high voltage generators according to various embodiments described above or their variants. In accordance with an exemplary embodiment, the control method may comprise controlling a phase relationship between the output voltage and the output current of the inverter (for example, the inverter bridge) to control the frequency of the driving signal of the switch transistor of the inverter bridge (2010). The method may repeat cyclically.

The frequency limiting mechanisms described herein, i.e., phase control and/or amplitude limiting techniques, ensure that the operating frequency of the resonant converter will not cross the resonant peak of the resonant circuit and/or will not increase to such a high level as to render some circuit components (such as IGBTs) unstable. By maintaining a phase lead in the voltage across the resonant circuit over the current through the resonant circuit, the resonant circuit operates in the inductive region, ensuring zero-voltage switching of the switch transistors. By preventing the gain of the circuit from falling below a minimum gain, using an amplitude limiting circuit, the resonant circuit operates at frequencies lower than that corresponding to the minimum gain, safe for the switching transistors.

The embodiments described above are not limiting. As would be understood by people of ordinary skill in the art, variations and combinations of the various embodiments described herein would still be consistent with the present disclosure. In addition, the descriptions of embodiments above refer to several different aspects of the present disclosure. It is to be understood that not all aspects are required. The present disclosure encompasses embodiments of any one of or any combination of the disclosed aspects. For example, an embodiment consistent with the present disclosure may include a phase control circuit for ensuring that the resonant converter operates in the inductive region, i.e., on the right side of the peak of a gain curve but might not include an amplitude control circuit; or vice versa. Likewise, an inverter circuit refers to a circuit that receives a DC input voltage and generates an AC output voltage. Even though inverter circuits in the embodiments above are described with switch transistors (such as IGBTs), alternative forms of inverter circuits may be adopted too, without affecting the operations of the resonant converter.

The steps and/or actions of the methods or algorithms described in connection with the aspects disclosed herein may be embodied directly in hardware, in a software module executed by a processor, or in a combination of the two. For example, the embodiments described above in connection with various methods may be implemented by a computer readable medium storing computer program codes, when executed by a processor/computer, the computer program codes perform any step of the previously described methods or any combination thereof.

The various illustrative logic, logical blocks, modules and circuits described in connection with the embodiments disclosed herein may be implemented or executed by general purpose processors, digital signal processors (DSPs), application specific integrated circuits (ASICs), field programmable gate arrays (FPGAs), or other programmable logic devices, discrete gate or transistor logic, discrete hardware components, or any combinations designed for executing the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). Moreover, at least one processor may comprise one or more modules function to execute the one or more steps and/or actions described above. For example, the embodiments described above in connection with various methods may be implemented by a processor and memory coupled with the processor, wherein the processor may be configured to perform any step of the previously described methods or any combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties such as molecular weight, reaction conditions, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A high voltage generator, comprising:
   an inverter bridge including a first bridge leg and a second bridge leg;
   a first resonant branch coupled in series to the first bridge leg;
   a transformer coupled in series between the first resonant branch and the second bridge leg;
   a second resonant branch coupled in parallel with the transformer, wherein the second resonant branch includes a capacitor and an inductor connected in series; and
   a rectifier circuit coupled with the transformer for providing an output voltage.

2. The high voltage generator of claim 1, wherein the first resonant branch comprises a series resonant branch comprising capacitors and/or inductors.

3. The high voltage generator of claim 1, wherein the second resonant branch is coupled in parallel with the primary side or the secondary side of the transformer.

4. The high voltage generator of claim 1, wherein the first bridge leg or the second bridge leg includes at least two switch transistors distributed in series, the switch transistor comprises an IGBT transistor, the IGBT transistor is operated between a first switching frequency and a second switching frequency, the first switching frequency is determined based on the first resonant branch and the second resonant branch, the second switching frequency is determined by the second resonant branch.

5. The high voltage generator of claim 1, further comprising a control circuit, the control circuit comprising a first control branch, a second control branch, and a modulator, and both the first control branch and the second control branch being coupled to the modulator;
   wherein the first control branch is operable to obtain an output current and a bridge leg voltage of the inverter bridge, and to produce a first control signal based on the output current and the bridge leg voltage of the inverter bridge;
   wherein the second control branch is operable to receive a voltage feedback signal from the rectifier circuit or an X-ray generating device, and to produce a second control signal based on the voltage feedback signal.

6. The high voltage generator of claim 5, wherein the first control branch comprises:
   a first zero-crossing comparator, an input of the first zero-crossing comparator being coupled with the output of the first bridge leg;
   a second zero-crossing comparator, an input of the second zero-crossing comparator being coupled with the output of the inverter bridge;
   a phase delay coupled in series to the first zero-crossing comparator;
   a phase comparator, an output of the phase delay and the output of the second zero-crossing comparator being coupled with an input of phase comparator; and
   a carrier generator, an input of the carrier generator being coupled with an output of the phase comparator, and an output of the carrier generator being coupled with the input of the modulator.

7. The high voltage generator of claim 5, wherein the second control branch comprises:
   an adder, an input of the adder being coupled with an output of the rectifier circuit or an output of the X-ray generating device;
   a regulator coupled with an output of the adder;
   a limiter, an input of the limiter being coupled with an output of the regulator, and an output of the limiter being coupled with an input of the modulator.

8. A method for controlling a high voltage generator, the high voltage generator comprising:
   an inverter bridge, the inverter bridge comprising a first bridge leg and a second bridge leg;
   a first resonant branch, the first resonant branch being coupled with the first bridge leg;
   a transformer coupled in series between the first resonant branch and the second bridge leg;
   a second resonant branch, the second resonant branch being coupled in parallel with the transformer, wherein the second resonant branch includes a capacitor and an inductor connected in series;
   a rectifier circuit, the rectifier circuit being coupled with the transformer for providing output voltage;
   the method comprising:
   controlling the phase relationship between the bridge leg voltage and the output current of the inverter bridge to control a frequency of a driving signal of the inverter bridge.

9. The method of claim 8, wherein the first bridge leg or the second bridge leg includes at least two switch transistors distributed in series, and controlling the phase relationship between the bridge leg voltage and the output current of the inverter bridge to control the frequency of the driving signal of the inverter bridge comprises:
   obtaining an output current and a bridge leg voltage of the inverter bridge;
   generating a phase signal based on the bridge leg voltage and the output current, and generating a first control signal based on the phase signal;
   obtaining an output voltage of the rectifier circuit, and producing a second control signal based on the output voltage of the rectifier circuit; and
   generating a driving signal for the switch transistors for driving the switch transistors to operate based on the first control signal and the second control signal.

10. The method of claim 8, wherein the phase of the bridge leg voltage is ahead of the phase of the output current of the inverter bridge.

11. The method of claim 8, wherein the first bridge leg is configured to couple to the anode of an X-ray generation device, the second bridge leg is configured to couple to the cathode of the X-ray generating device.

12. The method of claim 8, wherein the first bridge leg or the second bridge leg includes at least two switch transistors distributed in series, the first bridge leg or the second bridge leg comprises a plurality of IGBT transistors, the plurality of IGBT transistors are operated between a first switching frequency and a second switching frequency, the first switching frequency is determined based on the first resonant branch and the second resonant branch, the second switching frequency is determined by the second resonant branch.

13. A high voltage generator, comprising:
an inverter circuit coupled to receive a direct-current (DC) input voltage, wherein the inverter circuit includes a first bridge leg and a second bridge leg;
a resonant circuit coupled to the inverter circuit, wherein the resonant circuit includes a first resonant branch coupled in series to the first bridge leg and a second resonant branch coupled in parallel with a transformer;
the transformer coupled in series between the first resonant branch and the second bridge leg, and also coupled to a rectifier circuit, wherein the rectifier circuit is configured to provide a high voltage output, wherein the second resonant branch includes a second capacitor and a second inductor connected in series; and
a phase control circuit coupled to receive a voltage across and a current through the resonant circuit and also coupled to the inverter circuit, wherein the phase control circuit generates control signals to drive the inverter circuit, and wherein the control signals drive the inverter circuit to keep the resonant circuit operating in an inductive region.

14. The high voltage generator of claim 13, wherein the control signals drives the inverter circuit working at frequency higher than an upper resonance peak, based on a phase delay between the voltage and the current, and the upper resonance peak is corresponding to a first resonant frequency.

15. The high voltage generator of claim 14, further comprising an amplitude limiting circuit coupled to the rectifier circuit, the control signals drives the inverter circuit to work at frequency lower than a lower resonant peak based on a selection of the amplitude limiting circuit, and the lower resonant peak is corresponding to a second resonant frequency.

16. The high voltage generator of claim 13, wherein the first resonant branch includes a first inductor serially connected to a first capacitor.

17. The high voltage generator of claim 13, wherein the second resonant branch is coupled in parallel to the secondary windings of the transformer.

18. The high voltage generator of claim 13, wherein the second resonant branch is coupled in parallel to the primary windings of the transformer.

19. The high voltage generator of claim 13, wherein the first resonant branch includes a first inductor, wherein a first end of the first inductor is connected to the first bridge leg and a second end of the first inductor is connected to the second resonant branch.

20. The high voltage generator of claim 13, wherein the first bridge leg or the second bridge leg includes at least two switch transistors distributed in series, the first bridge leg or the second bridge leg comprises a plurality of IGBT transistors, the plurality of IGBT transistors are operated between a first switching frequency and a second switching frequency, the first switching frequency is determined based on the first resonant branch and the second resonant branch, the second switching frequency is determined by the second resonant branch.

* * * * *